(12) United States Patent
Meiler et al.

(10) Patent No.: US 12,400,040 B2
(45) Date of Patent: Aug. 26, 2025

(54) DETECTION OF UNAUTHORIZED COMPONENTS

(71) Applicant: Varex Imaging Corporation, Salt Lake City, UT (US)

(72) Inventors: Michael Rudolf Meiler, Draper, UT (US); Michelle Richmond, Palo Alto, CA (US); Christopher David Ginzton, Salt Lake City, UT (US)

(73) Assignee: VAREX IMAGING CORPORATION, Salt Lake City, UT (US)

( * ) Notice: Subject to any disclaimer, the term of this patent is extended or adjusted under 35 U.S.C. 154(b) by 499 days.

(21) Appl. No.: 16/293,572

(22) Filed: Mar. 5, 2019

(65) Prior Publication Data

US 2020/0074123 A1 Mar. 5, 2020

Related U.S. Application Data

(60) Provisional application No. 62/724,581, filed on Aug. 29, 2018.

(51) Int. Cl.
G06F 21/73 (2013.01)
G06F 21/71 (2013.01)
G06F 21/81 (2013.01)
G06F 21/86 (2013.01)
G06F 21/76 (2013.01)

(52) U.S. Cl.
CPC ............ G06F 21/71 (2013.01); G06F 21/73 (2013.01); G06F 21/81 (2013.01); G06F 21/86 (2013.01); G06F 21/76 (2013.01); G06F 2221/2143 (2013.01)

(58) Field of Classification Search
CPC .......... G06F 21/71; G06F 21/73; G06F 21/76; G06F 21/86
See application file for complete search history.

(56) References Cited

U.S. PATENT DOCUMENTS 3,838,285 A * 9/1974 Siedband ................ H05G 1/54
378/118
3,842,280 A * 10/1974 Herrick .................... H05G 1/54
378/112
(Continued)

FOREIGN PATENT DOCUMENTS

CN 105991659 A 10/2016
CN 106355096 A 1/2017
(Continued)

OTHER PUBLICATIONS

PCT/US2019/048258, International Search Report, Dec. 17, 2019.
(Continued)

Primary Examiner — Ellen Tran
(74) Attorney, Agent, or Firm — Dorsey & Whitney LLP

(57) ABSTRACT

Embodiments include a method, comprising: receiving from a first device at a second device, a request for a system identifier (ID) stored on the second device; and determining, by the second device, if the system ID stored on the second device has an empty value; when the system ID stored on the second device does not have the empty value, transmitting, by the second device to the first device, a response based on the system ID stored on the second device.

14 Claims, 20 Drawing Sheets

(56) References Cited

U.S. PATENT DOCUMENTS

| | | | |
|---|---|---|---|
| 3,968,372 A * | 7/1976 | Laughinghouse | H05G 1/54 378/118 |
| 4,035,648 A * | 7/1977 | Patel | H05G 1/46 378/93 |
| 4,811,374 A * | 3/1989 | Kasa | H05G 1/54 378/96 |
| 4,918,714 A * | 4/1990 | Adamski | H05G 1/04 378/117 |
| 4,918,716 A | 4/1990 | Hahn | |
| 7,107,189 B1 * | 9/2006 | Lounsberry | A61B 8/00 702/188 |
| 7,120,547 B2 | 10/2006 | Herrmann et al. | |
| 7,197,189 B2 | 3/2007 | Adelmann | |
| 7,766,549 B2 | 8/2010 | Flükiger et al. | |
| 10,127,409 B1 | 11/2018 | Wade et al. | |
| 2001/0056543 A1 | 12/2001 | Isomura | |
| 2007/0076847 A1 * | 4/2007 | Pellegrino | G21K 1/10 378/97 |
| 2009/0080621 A1 | 3/2009 | Flukiger et al. | |
| 2010/0327174 A1 * | 12/2010 | Edwards | G01N 23/203 250/370.09 |
| 2011/0267190 A1 | 11/2011 | Payson et al. | |
| 2012/0131680 A1 | 5/2012 | Baba | |
| 2013/0070896 A1 * | 3/2013 | Newman | A61B 6/4233 378/62 |
| 2013/0097694 A1 * | 4/2013 | Dang | G06F 21/70 726/17 |
| 2013/0283386 A1 | 10/2013 | Lee | |
| 2013/0329860 A1 * | 12/2013 | Nonaka | H04L 12/12 378/91 |
| 2014/0108786 A1 | 4/2014 | Kreft | |
| 2014/0169529 A1 * | 6/2014 | Hawver | H05G 1/56 378/116 |
| 2015/0063542 A1 * | 3/2015 | Park | A61B 6/563 378/62 |
| 2015/0199204 A1 * | 7/2015 | Bieswanger | G06F 8/654 713/189 |
| 2015/0254478 A1 | 9/2015 | Khesin | |
| 2016/0149917 A1 | 5/2016 | Matthieu et al. | |
| 2016/0247655 A1 * | 8/2016 | Niemann | H01J 35/025 |
| 2017/0027532 A1 * | 2/2017 | Joshi | A61B 6/44 |
| 2017/0357829 A1 * | 12/2017 | Park | G06F 21/70 |
| 2018/0082818 A1 * | 3/2018 | Meiler | H01J 35/025 |
| 2018/0103923 A1 | 4/2018 | Meiler et al. | |
| 2018/0114039 A1 | 4/2018 | Sion | |
| 2018/0214244 A1 * | 8/2018 | Fuerstenberg | A61B 90/98 |

FOREIGN PATENT DOCUMENTS

| | | |
|---|---|---|
| EP | 0860881 A2 | 8/1998 |
| EP | 1840964 A1 | 10/2007 |
| JP | H0351976 A | 3/1991 |
| JP | H08240884 A | 9/1996 |
| JP | H118625 A | 1/1999 |
| JP | 2005352656 A | 12/2005 |
| JP | 2006-229667 | 8/2006 |
| JP | 2006268128 A | 10/2006 |
| JP | 2006318074 A | 11/2006 |
| JP | 2007018401 A | 1/2007 |
| JP | 2009044575 A | 2/2009 |
| JP | 2009266143 A | 11/2009 |
| JP | 2018049813 A | 3/2018 |
| JP | 2018055598 A | 4/2018 |
| WO | 2020046875 A1 | 3/2020 |

OTHER PUBLICATIONS

PCT/US2019/048258, Written Opinion, Dec. 17, 2019.
PCT/US2019/048258, International Preliminary Report on Patentability, Mar. 2, 2021.
U.S. Appl. No. 16/293,543, Office Action, filed Mar. 18, 2021.
U.S. Appl. No. 16/293,543, Response to Office Action, filed Jun. 18, 2021.
U.S. Appl. No. 16/293,543, Office Action, filed May 3, 2022.
U.S. Appl. No. 16/293,543, Response to Office Action, filed Oct. 26, 2022.
U.S. Appl. No. 16/293,543, Response to final Office Action, filed Oct. 13, 2021.
U.S. Appl. No. 16/293,543, Response to Office Action, filed Apr. 13, 2022.
U.S. Appl. No. 16/293,543, Office Action, filed Feb. 6, 2023.
U.S. Appl. No. 16/293,543, Notice of Appeal, filed May 5, 2023.
U.S. Appl. No. 16/293,543, Appeal Brief, filed Nov. 6, 2023.
U.S. Appl. No. 16/293,543, Examiner's Answer, filed Jan. 30, 2024.
PCT/US2025/020269 International Search Report and Written Opinion dated May 8, 2025.

* cited by examiner

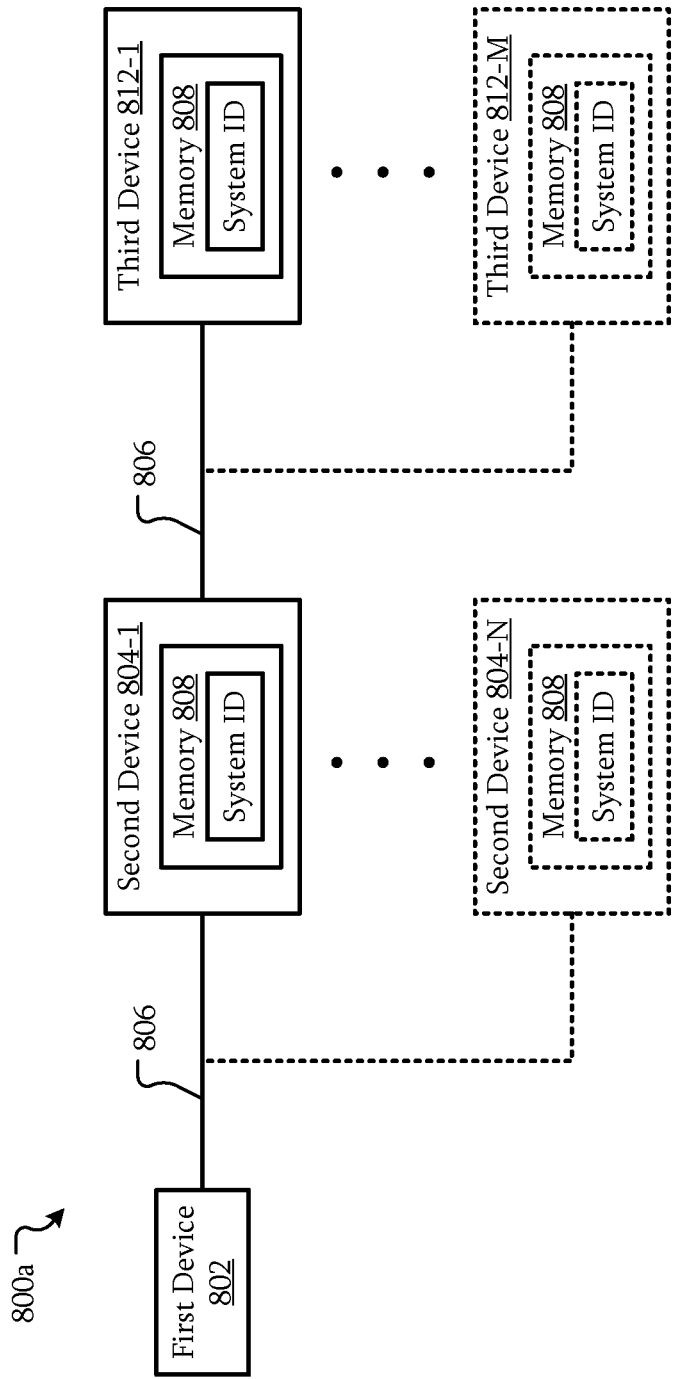

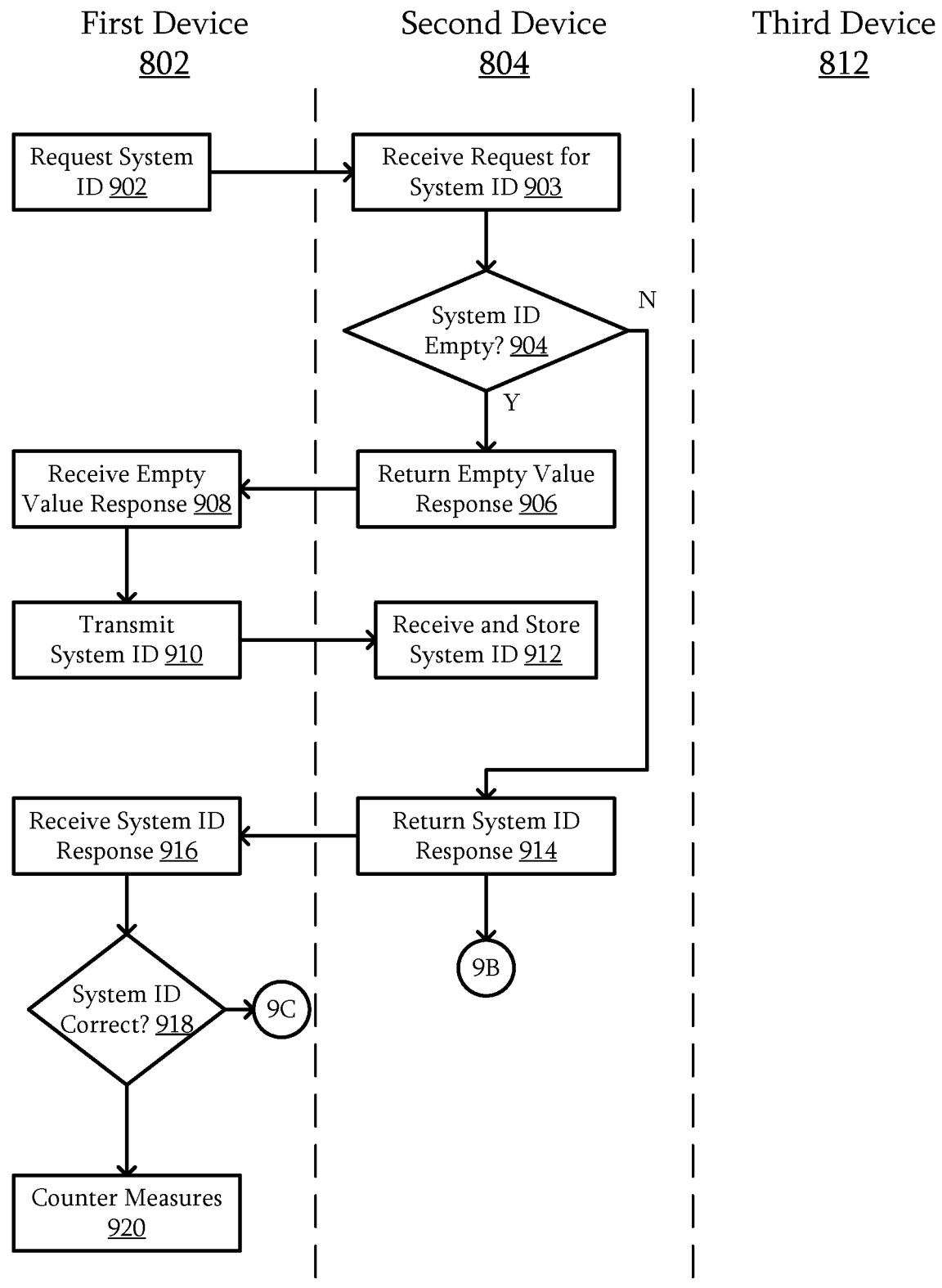

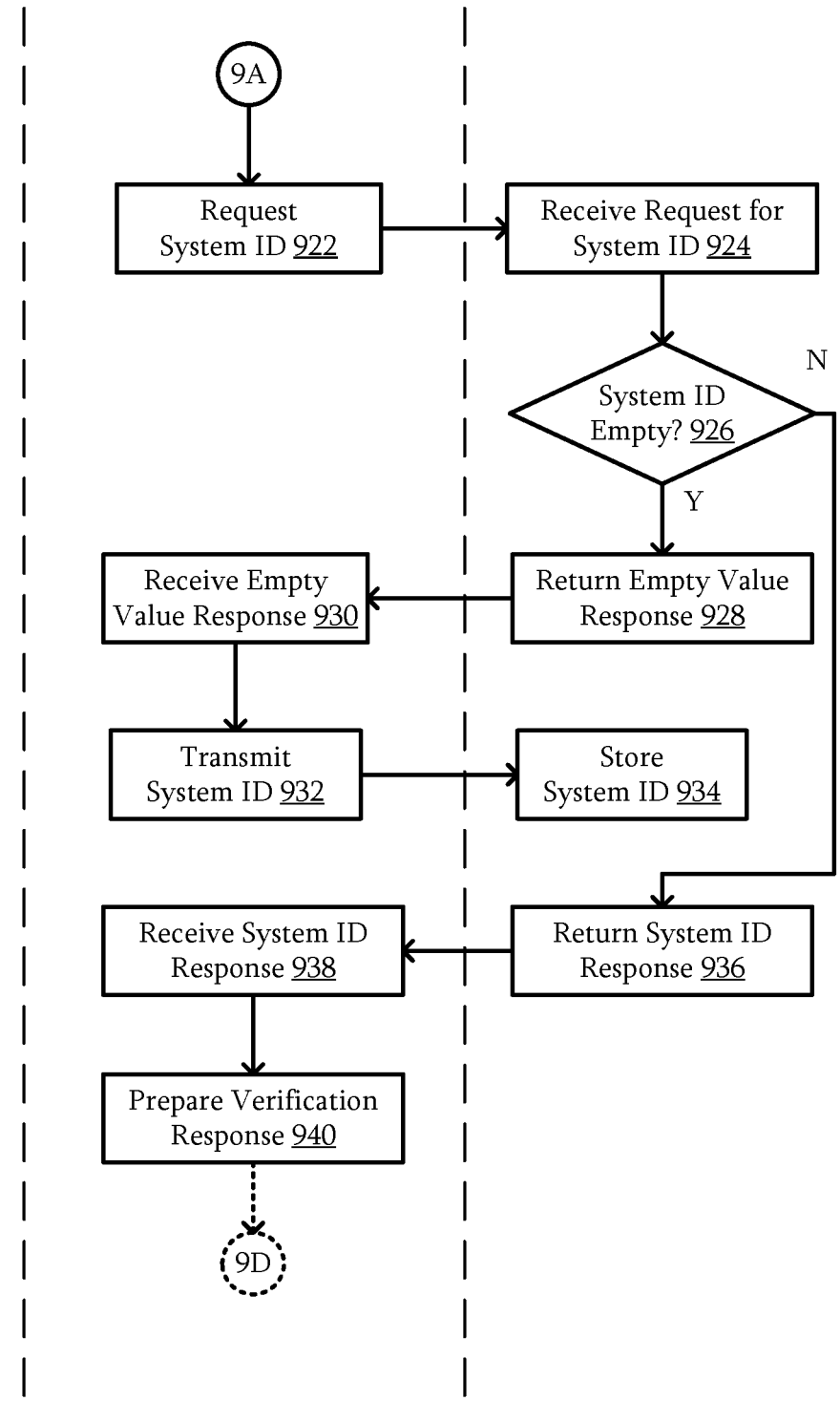

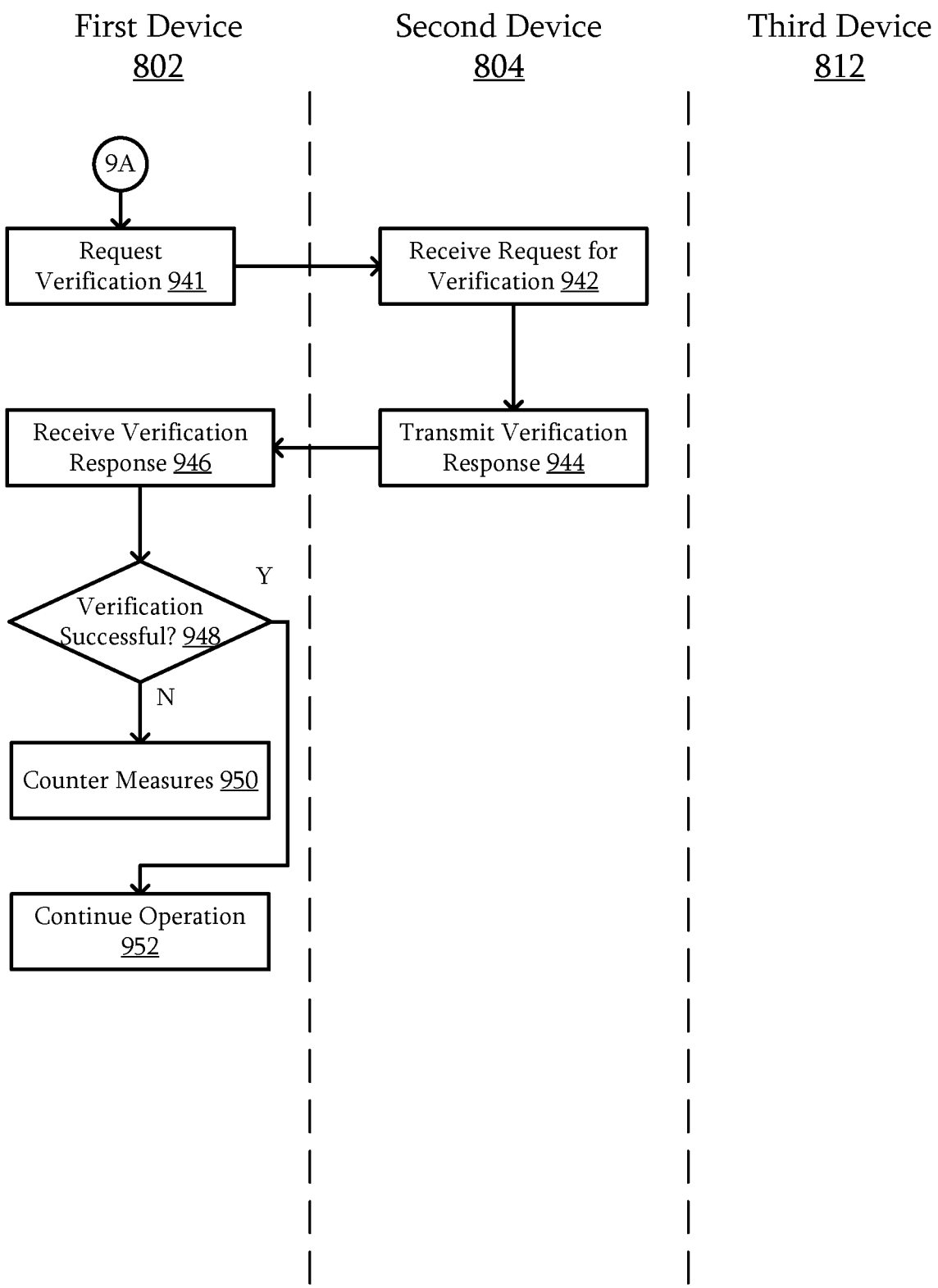

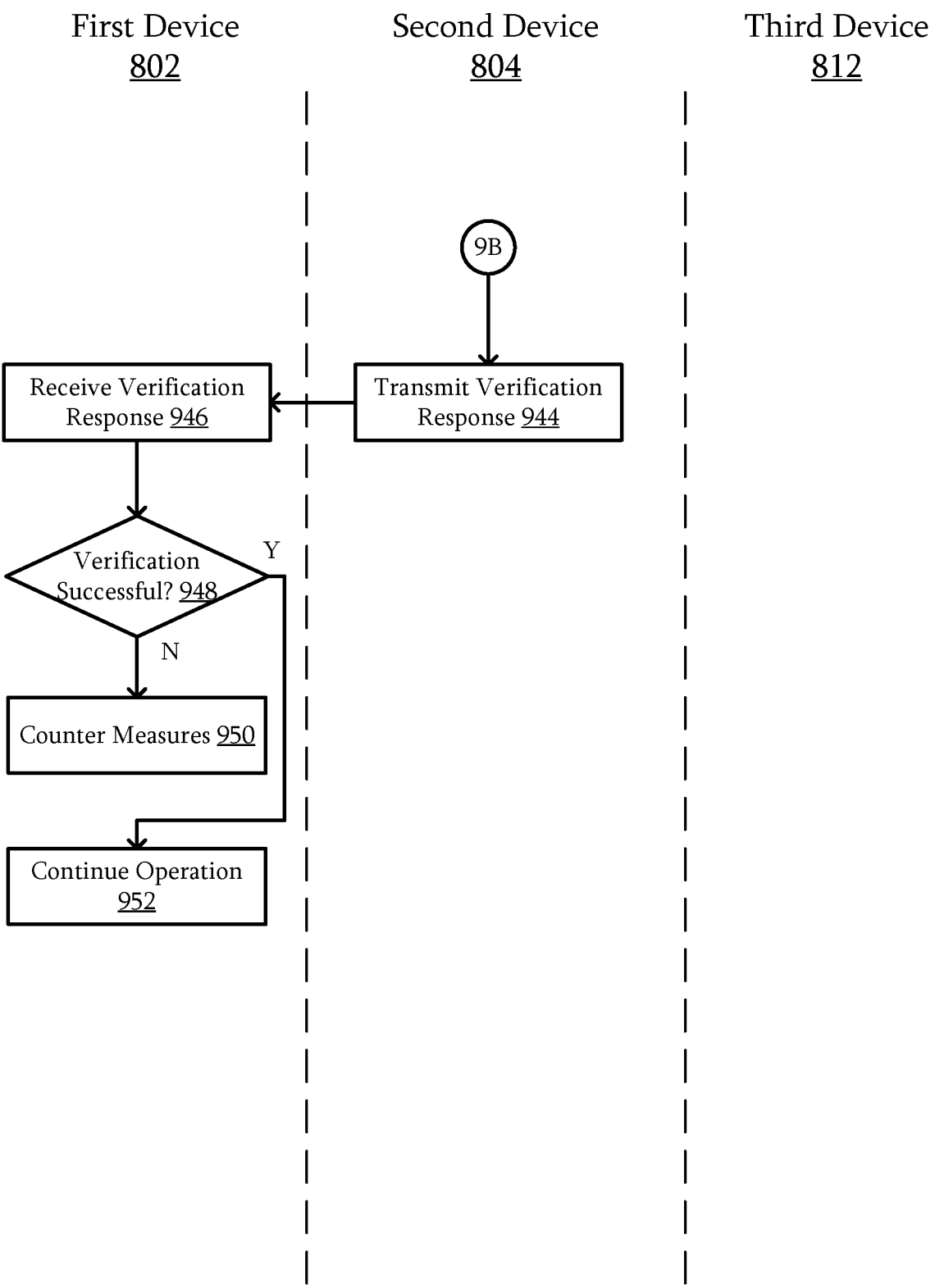

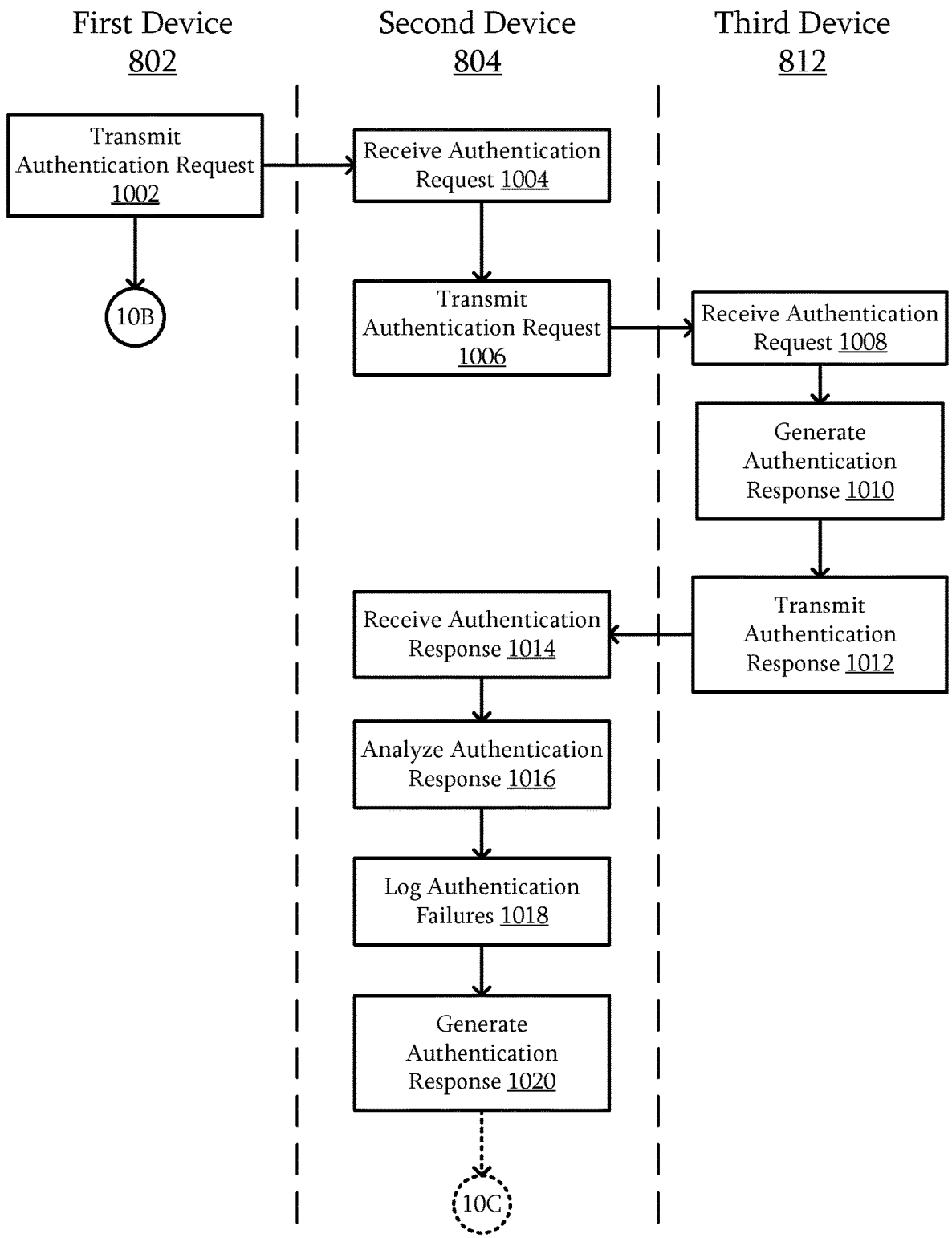

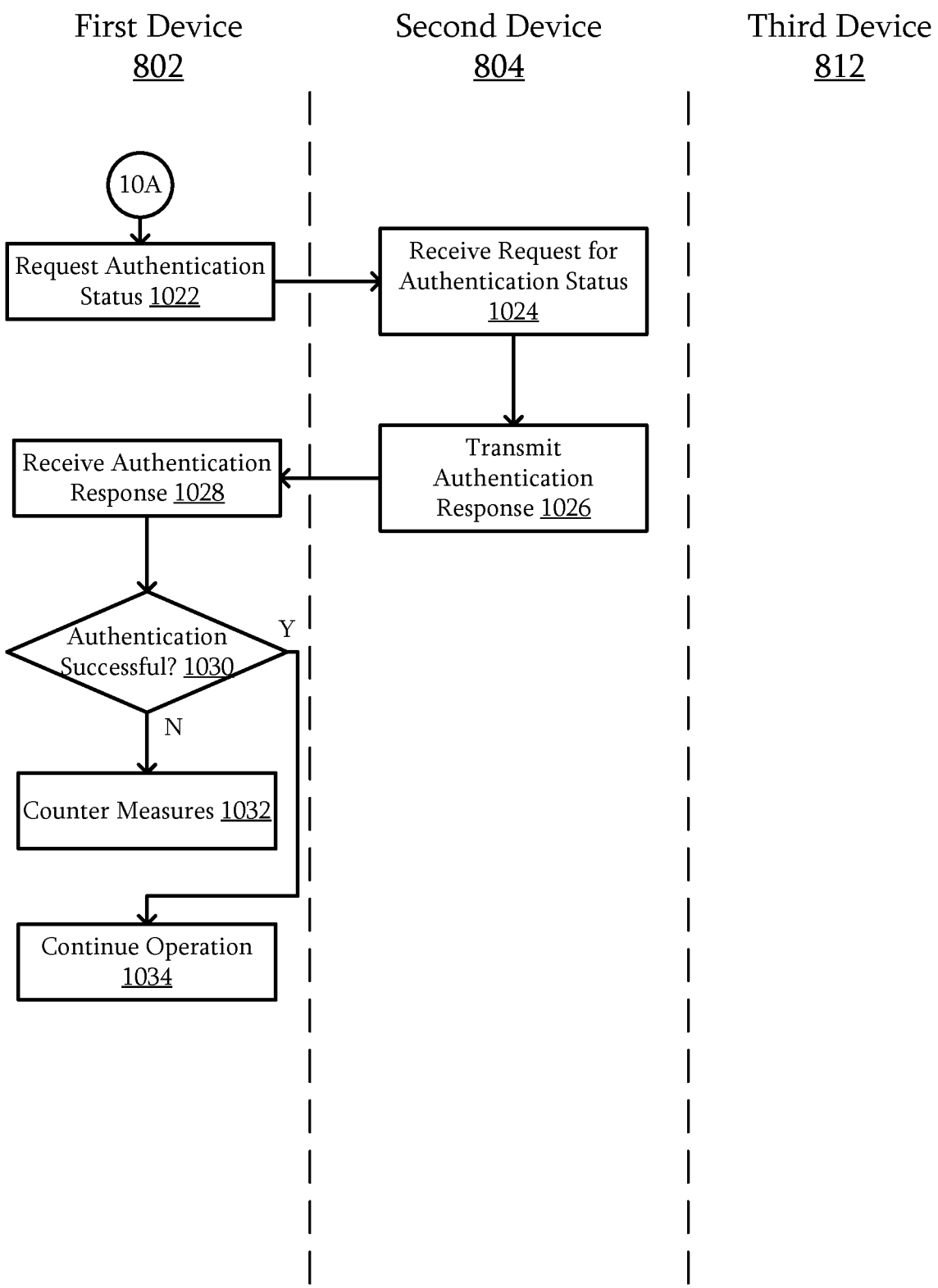

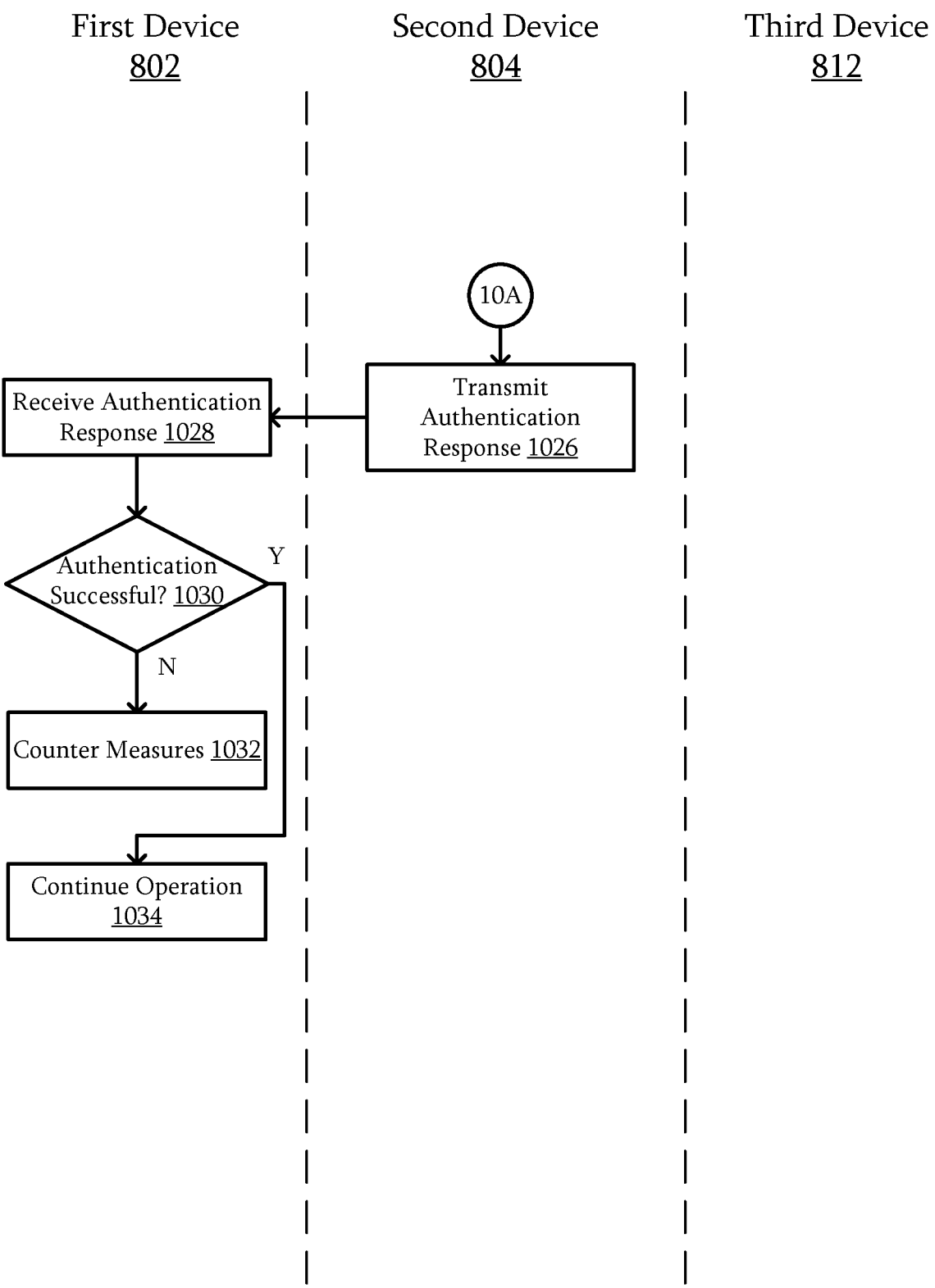

DETECTION OF UNAUTHORIZED COMPONENTS

BACKGROUND

Systems may be formed from a variety of different devices. Manufacturers, system integrators, or the like may design and install a particular system with authorized components. However, a third-party supplier may swap devices on similar systems, install used components, or third-party components that may lead to performance issues and/or damage to components of the system.

BRIEF DESCRIPTION OF THE DRAWINGS

FIG. 8A-8B are block diagrams of systems including an authorization system according to some embodiments.

FIGS. 9A-10C are flowcharts showing examples of techniques of operating an authorization system according to some embodiments.

DETAILED DESCRIPTION OF SOME EXAMPLE EMBODIMENTS

Figure 1A:
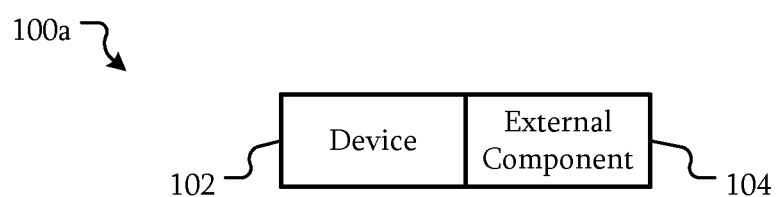
FIGS. 1A-1C are block diagrams of systems including a device with anti-tamper circuitry according to some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Numbers provided in flow charts and processes are provided for clarity in illustrating steps and operations and do not necessarily indicate a particular order or sequence. Unless otherwise defined, the term "or" can refer to a choice of alternatives (e.g., a disjunction operator, or an exclusive or) or a combination of the alternatives (e.g., a conjunction operator, and/or, a logical or, or a Boolean OR).

Some embodiments relate generally to mechanisms, methods, and systems to disable component authentication system when removed from a component. Some embodiments relate generally to switches and disabling components and/or circuitry.

Electronic devices may be used in an attempt to block the use of third-party components in systems such as computed tomography (CT) and x-ray systems. However, such electronic devices may be removed from systems including old, broken, worn out components, such as x-ray tubes. The electronic devices may then be installed on third-party or used tubes to be sold for use in an original equipment manufacturer (OEM) system. For example, a third-party may access an old, used, or broken x-ray tube from which the electronic devices can be removed. The electronic device can then be installed on a new, used, or third-party tube to enable the tube to simulate a genuine tube in the system.

As described herein, anti-tamper circuitry may not prevent the removal of the components or the electronic devices themselves but may disable at least some to all of the functionality of the device such as disabling authentication or other functions, deleting configuration information, or the like. As a result, the electronic device may not be able to perform those functions without having a manufacturer or authorized service representative reprogram the device. Thus, an unauthorized party may no longer be able to reuse the electronic device and access some to all of the functionality. As will be described in further detail below, the effect of the loss of some to all of the functionality may result in a range of effects from a warning message to disabling of the electronic device or a system including the electronic device.

In some embodiments, in an x-ray system, an x-ray tubes designed and built by the manufacturer may include tube specific information to be used in conjunction with a tube auxiliary unit (TAU) to function with proper imaging and without damage to the tube. That tube specific information may reside in non-volatile random-access memory (NVRAM), such as flash memory or solid-state storage, of the TAU. Since some of the information stored in the TAU is tube specific, if its TAU were to be swapped to a different tube, its tube specific information would no longer match the specific x-ray tube. The mismatch could cause image quality issues and/or irreparable x-ray tube damage if used. The anti-tamper circuitry may reduce or eliminate a chance that the TAU is swapped between different x-ray tubes and providing the incorrect tube specific information to a system.

Figure 1B:
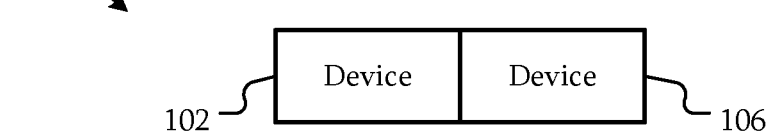
Figure 1C:
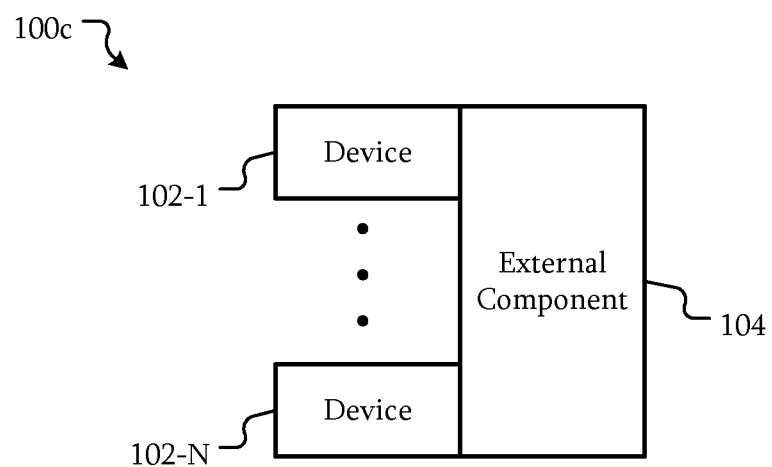
Figure 2:
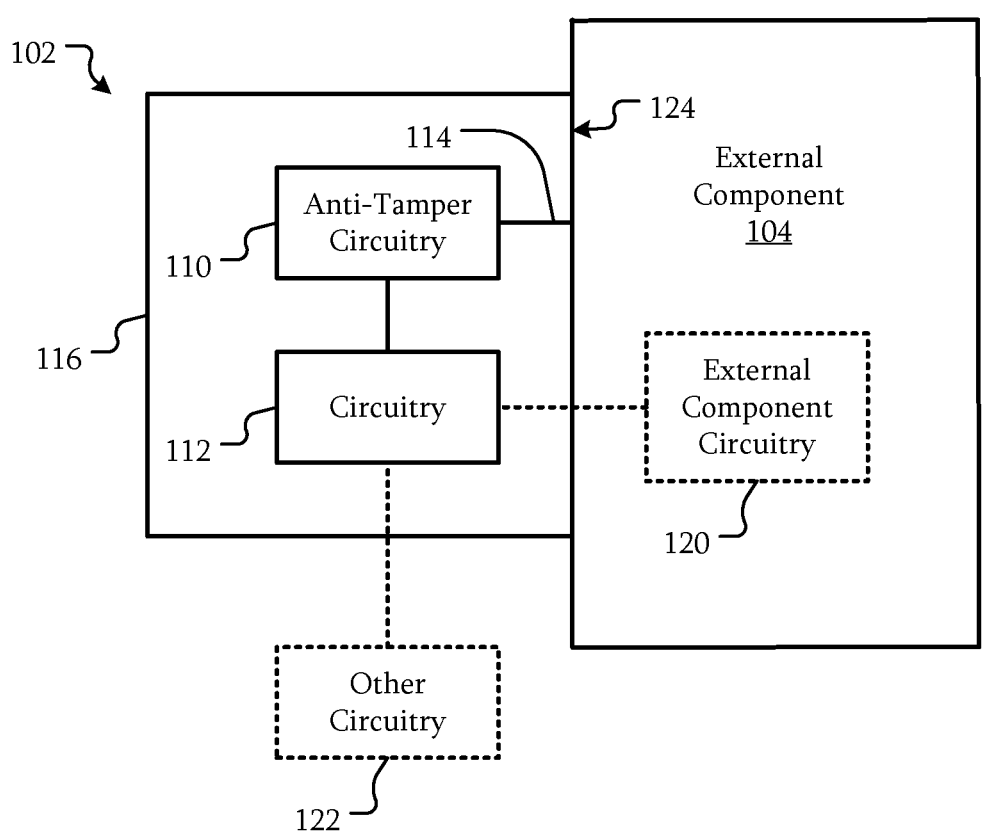
FIG. 2 is a block diagram of a device with anti-tamper circuitry according to some embodiments.

FIGS. 1A-1C are block diagrams of systems including a device with anti-tamper circuitry according to some embodiments. FIG. 2 is a block diagram of a device with anti-tamper circuitry according to some embodiments.

Referring to FIGS. 1A and 2, the system 100a includes a device 102 configured to be mounted to an external component 104. The device 102 includes anti-tamper circuitry 110 and circuitry 112.

Examples of the device 102 include devices with circuitry 112 that may include customized components, firmware, software, data or the like. The firmware or software may include instructions that implement proprietary communication and/or control techniques with other circuitry 122 or circuitry 120 of the external component 104. In other embodiments, the data may include authentication information, cryptographic information, performance data, or the like. Particular examples of the device 102 include an authentication circuit for a system, a control circuitry for an x-ray tube, or the like.

The external component 104 may include a purely structural component and/or a circuitry with some functional capabilities. For example, in some embodiments, the external component 104 is a housing of a system that includes the device 102. The device 102 may be mounted to that housing and hence, mounted to the external component 104.

The device 102 includes a housing 116 configured to restrict access to disarm the disarm the anti-tamper circuitry 110 when the device 102 is mounted to the external component 104. For example, the housing 116 may include a sealed case surrounding the anti-tamper circuitry 110 and the circuitry 112. When the housing 116 is mounted to the external component 104, the combination of the housing 116 and the external component 104, such as a wall 124 of the external component 104, may completely enclose the anti-tamper circuitry 110 and the circuitry 112. In some embodiments, the combination may enclose the anti-tamper circuitry 110 and the circuitry 112 sufficiently to prevent access to the anti-tamper circuitry 110 or the circuitry 112 without significantly modifying or destroying the housing 116. The combination of the housing 116 and the external component 104 may be configured such that accessing the anti-tamper circuitry 110 or the circuitry 112 is significantly more difficult than removing the device 102 from the external component 104.

The device 102 includes anti-tamper circuitry 110 electrically connected to circuitry 112. The anti-tamper circuitry 110 is configured to disable at least one function of the circuitry 112 when the device 102 is removed from the external component 104. In particular, the anti-tamper circuitry 110 is coupled to the external component 104 through coupling 114. This coupling 114 may be a mechanical, electrical, optical, magnetic, other similar couplings, or a combination of such couplings. For example, a switch may be switched when the device 102 is mounted on the external component 104. Switched can refer to either toggling from an on state to an off state or toggling from an off state to an on state. The switch may have a mechanically or magnetically switchable pole. A state of the switch may change depending on whether the device 102 is a mounted on the external component 104 or if it is being removed from the external component. In other embodiments, the switch may change state when a fastener that is used to mount the device 102 on the external component is removed. In other embodiments, an electrical circuit may be created through a portion of the external component 104, such as through a metallic portion of the wall 124. Removal of the device 102 from the external component may be detected by a break in that circuit. Although some circuits and structures have been used as examples of configurations by which the anti-tamper circuitry 110 may sense the removal of the device 102 from the external component 104, the anti-tamper circuitry 110 may sense the removal in other ways.

Embodiments described herein may be used anywhere where a device 102 should stay physically paired to the system 100a, the external component circuitry 120, the other circuitry 122, or another component or device to which they are mounted and/or associated. Paired in this sense could mean physically in touch, in proximity, in communication with, integrated into the device, or the like.

In response to sensing the removal of the anti-tamper circuitry 110 from the external component 104, the anti-tamper circuitry 110 may be configured to disable at least one function of the circuitry 112. The particular function of the circuitry 112 may include a capability of general processing, the use of particular data, the ability to properly respond to authentication challenges, or the like. In some embodiments, data stored in the circuitry 112 may be erased. The data may include cryptographic information, authentication information, identification information, operational information, firmware, software, or the like. In some embodiments, non-volatile memory of the circuitry 112 may be erased to disable at least one function. In other embodiments, fuses that affect operation of the circuitry 112 may be blown to disable at least one function. While some embodiments may disable at least one function, in other embodiments, the anti-tamper circuitry 110 may be configured to disable all functions of the circuitry 112 or the entire device 102.

In some embodiments, the circuitry 112 is configured to control the external component. The circuitry 112 may be coupled to the external component circuitry 120. In a particular example, the circuitry 112 may include control circuitry for an x-ray tube. The external component circuitry 120 may include an anode, cathode, filament, emitter, motor, steering electronics, focusing electronics, or other circuitry that may be part of an x-ray tube.

In some embodiments, other techniques for preventing reuse could be triggered by radio-frequency identification sensors (RFID), light sensors, proximity sensors, bar code readers, cameras that process the tube serial number or other identifying features, trip wires, tamper resistant mounting, or any combination of such techniques. These techniques could be paired with the ability of the anti-tamper circuitry 110 to disable at least one function of the circuitry 112 as described herein.

Referring to FIGS. 1B and 2, in some embodiments, the external component 104 may be another device 106. For example, the device 106 may be an interface circuit board configured to provide an interface between a system control component and other components of the system. In a particular example, the device 106 may be an interface board that converts controls and/or communication between the system controller for an x-ray system and particular sub-systems, such as an x-ray generation subsystem, a power sub-system, a detector sub-system, a cooling subsystem, a user interface sub-system, or the like.

The device 102 may be an authentication daughter board (ADB) configured to store authentication information, perform authentication functions, negotiate authentication between a system controller and the device 106 or other sub-systems of the system 100b, or the like.

Referring to FIG. 1C, in some embodiments, more than one device 102 may be mounted on the external component 104. In this example, N devices 102 are mounted on the external component 104. The devices 102-1 to 102-N may be the same, similar, or different. However, some to all of the devices 102-1 to 102-N may include the anti-tamper circuitry 110 described herein.

In some embodiments, the anti-tamper circuitry 110 prevents the reuse, modification, tampering, replacement, or reinstallation of the device 102, by a third-party or onto a third-party component. As described above, the device 102 may be part of an authentication system. The authentication system may be configured to determine whether or not a component in the system, which may be the device 102, the external component 104, or another component, is a genuine manufacturer or OEM component by issuing an encrypted challenge question to a cryptographic electronic device on the component.

In a particular example, the device 102 may include the cryptographic electronic device as part of the circuitry 112. The device 102 includes the circuitry that controls the external component 104. If the cryptographic electronic device can be removed from the genuine component and installed on a counterfeit component, then the authentication system can be defeated. However, the anti-tamper circuitry 110 is triggered upon removal of the device 102. The at least one function of the circuitry 112 that is disabled may include the authentication functions, authentication information, or the like. After the anti-tamper circuitry 110 is triggered, the cryptographic electronic device would no longer respond properly to authentication requests. As a result, the system 100 would have an indication that the device 102 and/or external component 104 can no longer be trusted to be a genuine manufacturer or OEM component.

In some embodiments, service contracts may be a large source of revenue for an OEM. Anti-tamper circuitry 110 as described herein may be used by the OEM to reduce or eliminate an ability of third-party manufacturers or resellers to install competing or replacement products, or incompatible components that can result in performance and patient safety issues.

Figure 3A:
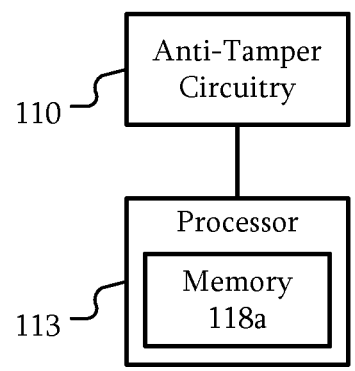
FIGS. 3A-3C are block diagrams of circuitry of devices with anti-tamper circuitry according to some embodiments.
Figure 3B:
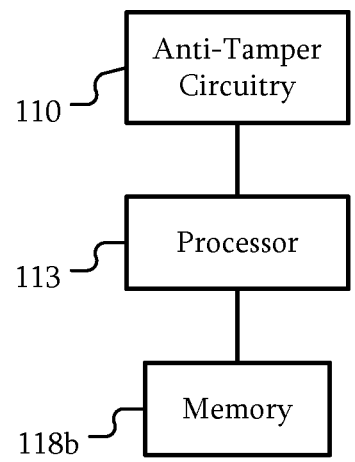
Figure 3C:
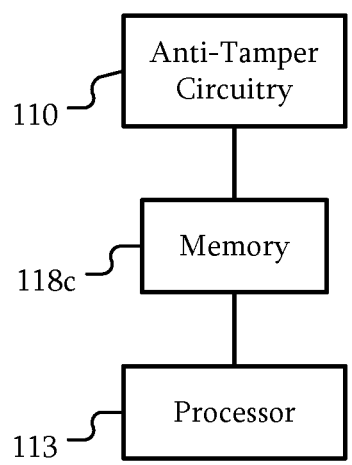

FIGS. 3A-3C are block diagrams of circuitry of devices with anti-tamper circuitry according to some embodiments. In these embodiments, the circuitry includes anti-tamper circuitry 110 similar to that described above, a processor 113, and a memory 118. The processor 113 and memory 118 are examples of circuitry 112 described above.

The processor 113 may be a general-purpose processor, a digital signal processor (DSP), an application specific integrated circuit, a microcontroller, a programmable logic device, discrete circuits, a combination of such devices, or the like. The processor 113 may include internal portions, such as registers, cache memory, volatile memory, non-volatile memory, processing cores, or the like, and may also include external interfaces, such as address and data bus interfaces, interrupt interfaces, or the like. Although only one processor 113 is illustrated, multiple processors 113 may be present. In addition, other interface devices, such as logic chipsets, hubs, memory controllers, communication interfaces, or the like may be included to connect the processor 113 to internal and external components.

The processor 113 is coupled to the memory 118. The memory 118 includes data such as cryptographic information, authentication information, identification information, operational information, firmware, software, or the like as described above. The anti-tamper circuitry 110 is configured to erase at least a portion of the memory 118 used by the processor 113 when the device 102 is removed from the external component 104. In some embodiments, the erasure may be of all of such data. In other embodiments, the erasure may be of a sufficient quantity and quality of the data to render the device 102 inoperable, such as the erasure of secret information such as cryptographic keys.

Referring to FIG. 3A, in some embodiments, the processor 113 includes on-chip or otherwise integrated memory 118a. As a result, when the anti-tamper circuitry 110 erases at least a portion of the memory 118a, the memory erased is memory integrated with the processor 113.

Referring to FIG. 3B, in some embodiments, the anti-tamper circuitry 110 is coupled to the processor 113. The processor 113 is coupled to external memory 118b. The anti-tamper circuitry 110 may be configured to activate the processor 113 and cause the processor 113 to execute commands to erase the at least a portion of the external memory 118b. For example, the anti-tamper circuitry 110 may cause the processor to execute an interrupt service routine that erases the portion of the memory 118b. In another example, the anti-tamper circuitry 110 may be configured to boot the processor 113 in a mode specifically designed to erase the portion of the memory 118b. Although the processor 113 is illustrated as being directly coupled to the memory 118b, in other embodiments, other intervening circuitry may be present, such as a memory controller.

Referring to FIG. 3C, in some embodiments, the anti-tamper circuitry 110 may be configured to access the memory 118c without accessing the processor 113. Accordingly, the anti-tamper circuitry 110 may be configured to erase the portion of the memory by controlling the memory 118c.

While a variety of configurations of the anti-tamper circuitry 110, processor 113, and memory 118 have been described above, in other embodiments, the anti-tamper circuitry 110, processor 113, and memory 118 may be coupled in any manner such that the anti-tamper circuitry 110 may cause the portion of the memory 118 used by the processor 113 to be erased.

Figure 4A:
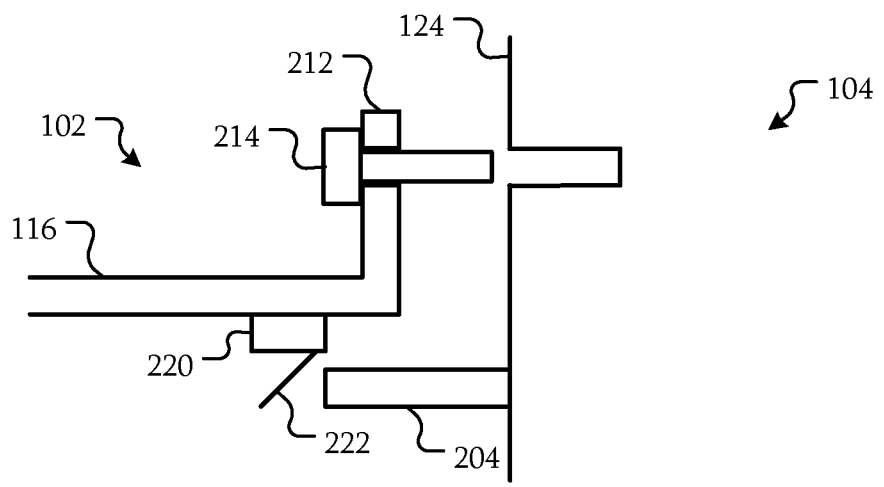
FIG. 4A-4B are cross-sectional diagrams illustrating mounting a device with anti-tamper circuitry on an external component according to some embodiments.
Figure 4B:
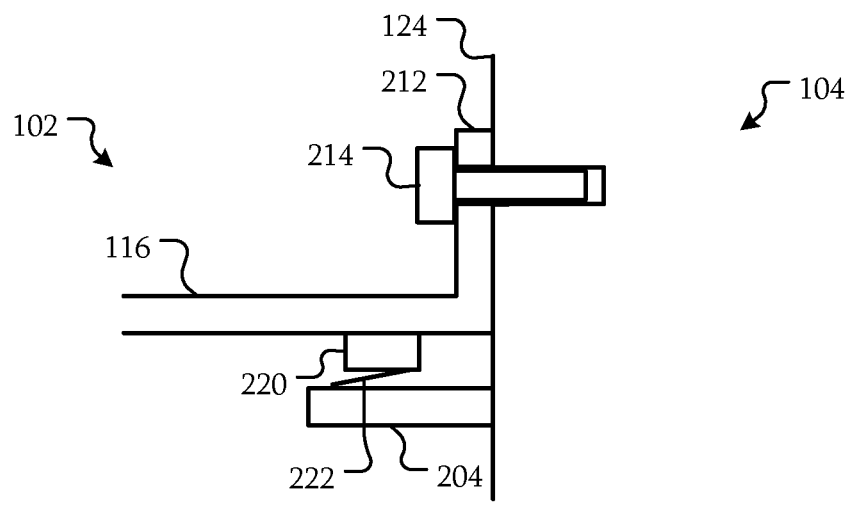

FIG. 4A-4B are cross-sectional diagrams illustrating mounting a device with anti-tamper circuitry on an external component according to some embodiments. FIG. 4A illustrates a state of a device 102 and an external component 104 before the device 102 is mounted to the external component 104 or after the device 102 is removed from the external component 104. FIG. 4B illustrates a state of the device 102 and the external component 104 when the device 102 is mounted to the external component 104.

Referring to FIGS. 4A and 4B, in some embodiments, the device 102 includes a housing 116. The device 102 includes a switch 220. The switch 220 is coupled to the housing 116. Although the housing 116 is illustrated as an example of a mounting structure of the device 102, in other embodiments, the mounting structure may be a structure other than the housing 116. The mounting structure may be any structure, board, component, or the like that remains with the device 102 when the device is moved relative to the external component 104. The housing includes a flange 212. A fastener 214 may be used to attach the housing 116 to the wall 124 of the external component 104. While mounting components such as the flange 212 and fastener 214 have been used as examples, in other embodiments, different mounting techniques may be used.

The switch 220 is configured to switch when the device 102 is removed from the external component 104. When the device 102 is in the state illustrated in FIG. 4A, the switch 220 has a pole 222 in a first state. In a particular example, the switch 220 may be a momentary normally closed switch. Thus, in the state illustrated in FIG. 4A, the switch 220 is closed.

As the device 102 is mounted on the external component 104 as illustrated in FIG. 4B, a structure 204 of the external component 104 causes the pole 222 of the switch 220 to switch. Thus, the switch 220 is opened.

In some embodiments, the structure 204 is a protrusion, wall, rib, gusset, fastener, or the like. The structure 204 disposed on the external component 104 such that when the device 102 is mounted on the external component 104, the structure 204 toggles the state of the switch 220.

Although a particular structure of the device 102, external component 104, and switch 220 has been used as an example, any mechanism and associated structures may be used that causes the switch 220 to be in a first state when mounted and in a second state when removed. In particular, the mechanism and associated structures may be formed such that the switch 220 changes state before the anti-tamper circuitry 110 may be accessed to disable the anti-tamper circuitry 110 or otherwise prevent it from disabling at least one function of the circuitry 112 as described above.

In addition, the switch 220 need not be mechanically switched. For example, the switch 220 may be magnetically switched. The structure 204 may include a magnet or a ferromagnetic material according to the structure of the switch 220 such that the switch 220 changes state as the device 102 is mounted to or removed from the external component 104.

While a single switch 220 has been used as an example, in other embodiments, multiple switches 220 in different locations and/or different configurations may be used. In some embodiments, any one of these switches 220 may be used by the anti-tamper circuitry 110 to disable at least one function of the circuitry 112.

Figure 5A:
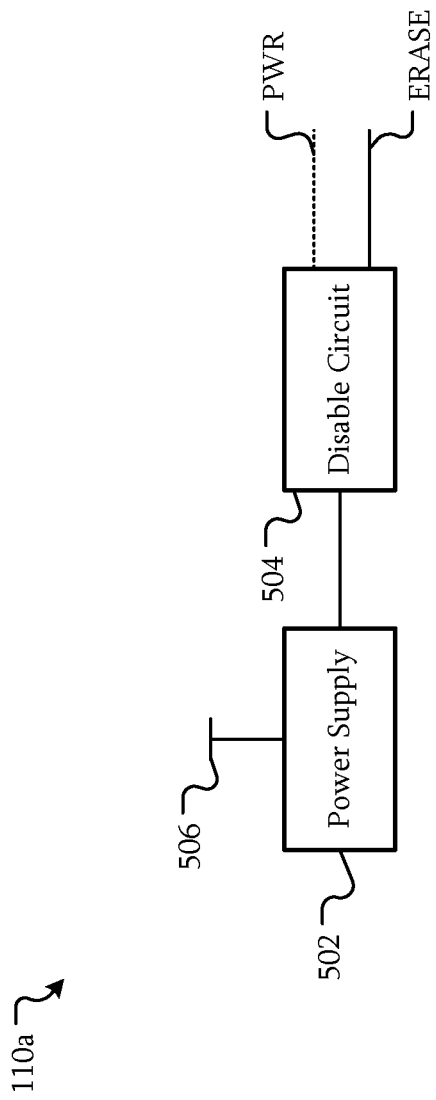
FIGS. 5A-5D are schematic diagrams of circuitry of anti-tamper circuitry according to some embodiments.

FIGS. 5A-5D are schematic diagrams of circuitry of anti-tamper circuitry according to some embodiments. Referring to FIG. 5A, the anti-tamper circuitry 110a includes a power supply 502 and a disable circuit 504. The power supply 502 is configured to generate power that may be used by the disable circuit 504 and potentially a portion of the circuitry 112.

The power supply 502 is disposed within the device 102. The power supply 502 is configured to supply power after detecting removal of the device 102 from the external component 104. The power supply 502 may include a battery, a capacitor, a supercapacitor, or any other energy storage device that may be disposed within the device 102. In some embodiments, the power supply 502 may be charged by an external power source 506.

In some embodiments, the power supply 502 may include switches that connect the power supply 502 to other components of the anti-tamper circuitry 110 when the device 102 is removed from the external component 104.

The disable circuit 504 is a circuit configured to disable the at least one function of the circuitry 112. In this example, the disable circuit 504 includes an ERASE output. The ERASE output is a signal coupled to an ERASE input on a processor, memory, or the like of the circuitry 112 that would initiate an erase command to erase memory or otherwise disable the at least one function.

In some embodiments, power PWR may also be provided to some components of the circuitry 112. In particular, the device 102 may not be connected to an external power source or the external power source may be disabled when the device 102 is being removed from the external component 104. The power supply 502 may instead supply the power needed to allow the disable circuit 504 to disable the at least one function of the circuitry 112.

Figure 5B:
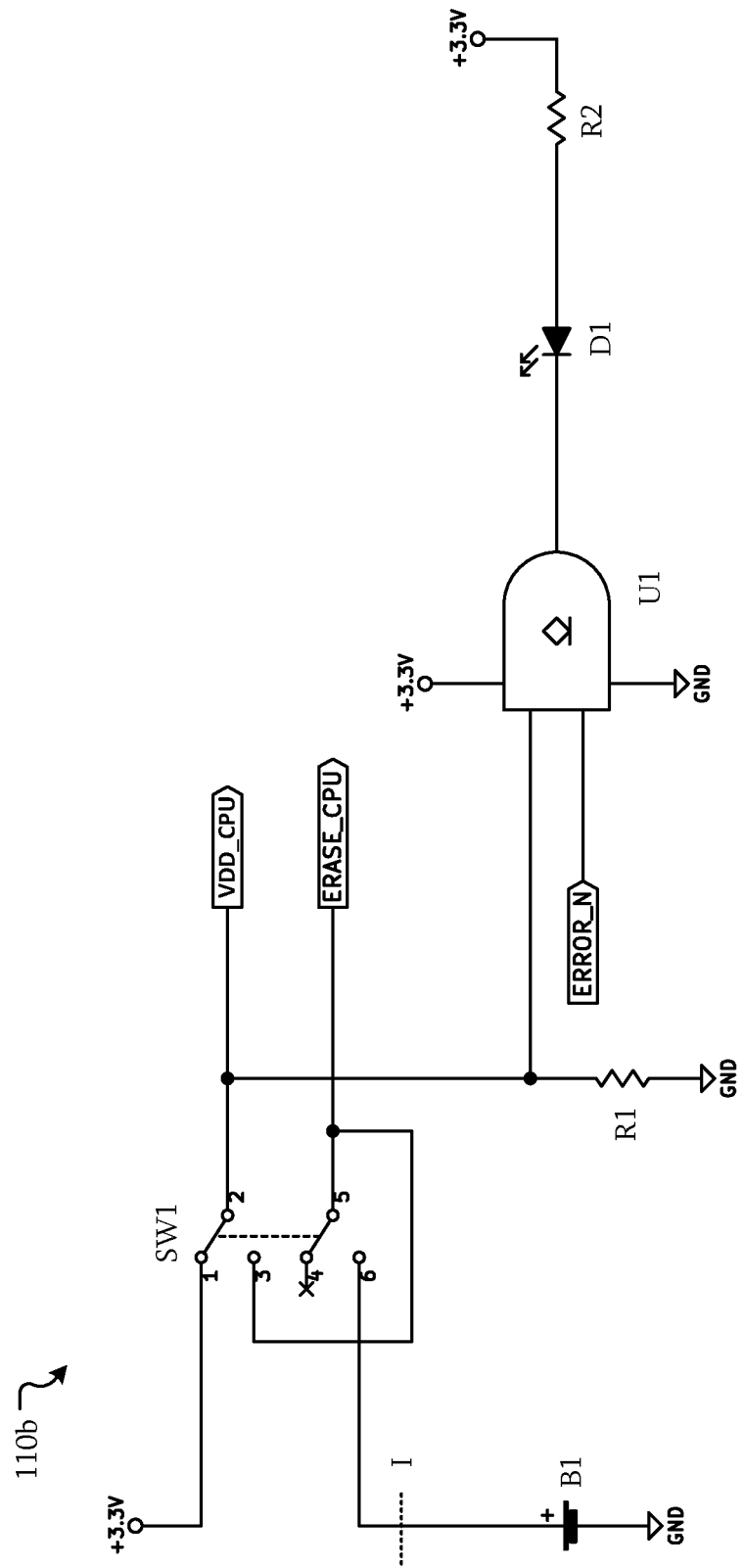

Referring to FIG. 5B, the anti-tamper circuitry 110b includes battery B1 and switch SW1. A single battery B1 is illustrated; however, in other embodiments, multiple batteries may be used. The switch SW1 is a double-pole double-throw switch (DPDT). The switch SW1 is coupled such that in the illustrated state, 3.3V is coupled to VDD_CPU and no connection is made to ERASE-CPU. In the other state, both VDD_CPU and ERASE_CPU are coupled to the battery B1.

VDD_CPU is a power supply for a processor that may be part of the circuitry 112. ERASE_CPU is a signal that commands the processor of the circuitry 112 to erase some or all of its memory. As a result, the at least one function of the circuitry 112 may be disabled. The switch SW1 is illustrated in the state when the corresponding device 102 is mounted to the external component 104. When removed, the switch SW1 will transition to the other state, which will supply power to the processor through VDD_CPU and supply the erase signal through ERASE_CPU.

The isolator I is a removable structure configured to disconnect the battery B1 from the switch. When in place, the battery B1 be disconnected and will not supply power to the switch SW1. Thus, ERASE_CPU will not be activated. The isolator I may be in place during installation to disable the anti-tamper circuitry 110b.

Other circuitry illustrated may provide a status indicator for a variety of states. R1 is coupled to VDD_CPU and pulls down the input to AND gate U1. The other input to AND gate U1 is an error signal ERROR_N. When the device 102 is being installed and the 3.3V power is applied, the switch SW1 will be in the opposite state. However, as the isolator I is present, the battery will not enable ERASE_CPU. VDD_CPU will not be coupled to 3.3V and will be pulled down by R1. Thus, the output of AND gate U1 will be low, turning on LED D1. Once the device 102 is properly installed, the switch SW1 will change to the illustrated state and VDD_CPU will be set to 3.3V. The AND gate U1 output will switch to high, assuming there is no error indicated by a low on ERROR_N. The high output will cause the LED D1 to turn off. As a result, an installer will receive a visual indication that the device 102 is installed such that the switch SW1 is in the illustrated state.

Once installed, the isolator I may be removed. ERROR_N will control the output of the AND gate U1 and whether LED D1 is on. Thus, the LED D1 will act as an error indicator. However, if the device 102 is removed, the switch SW1 will change state, activating VDD_CPU and ERASE_CPU.

In an example, the SW1 switch is a normally closed (NC) double pole, double throw (DPDT) switch where the closed state couples the battery B1 to ERASE_CPU. The switch can be normally closed (NC) and open when the switch is depressed, such as when the device 102 is installed and a feature of the external component 104 presses on the switch.

Figure 5C:
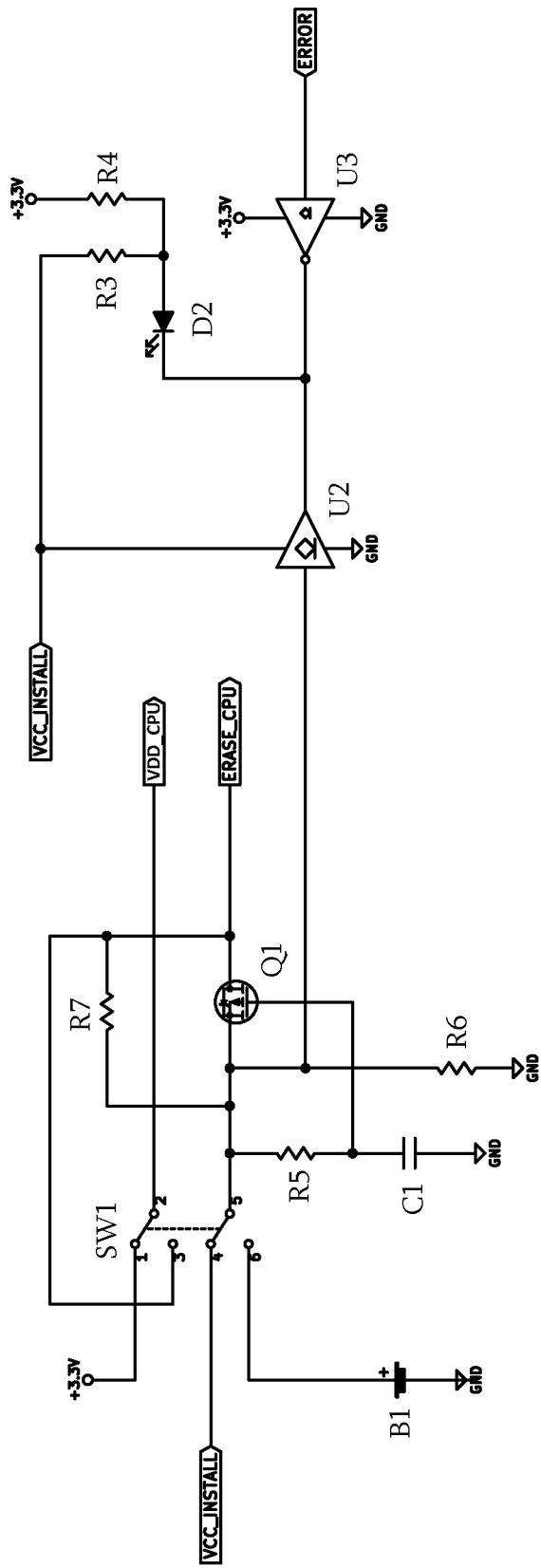

Referring to FIG. 5C, the operation may be similar to that of FIG. 5B. However, VCC_INSTALL is a power voltage supplied during installation when 3.3V may not be active. Resistors R3 and R4 are in series with LED D2 for either VCC_INSTALL or 3.3V. Thus, when the cathode of LED D2 is pulled low, LED D2 will turn on. Buffer U2 is an open-drain buffer. Inverter U3 is an open-drain inverter. Thus, if the input to U2 is low or if the input to U3 is high, the LED D2 will be turned on.

When the switch is in the installed state, ERASE_CPU and the nodes coupled to resistors R5, R6, R7, and Q1 are pulled to ground and transistor Q1 is off. However, once the device 102 is removed from the external component 104, switch SW1 changes state, increasing the voltage of node N1, pulsing ERASE_CPU until C1 charges. R5 and C1 are selected to provide a sufficient pulse to erase a portion of the memory to disable the at least one function.

Figure 5D:
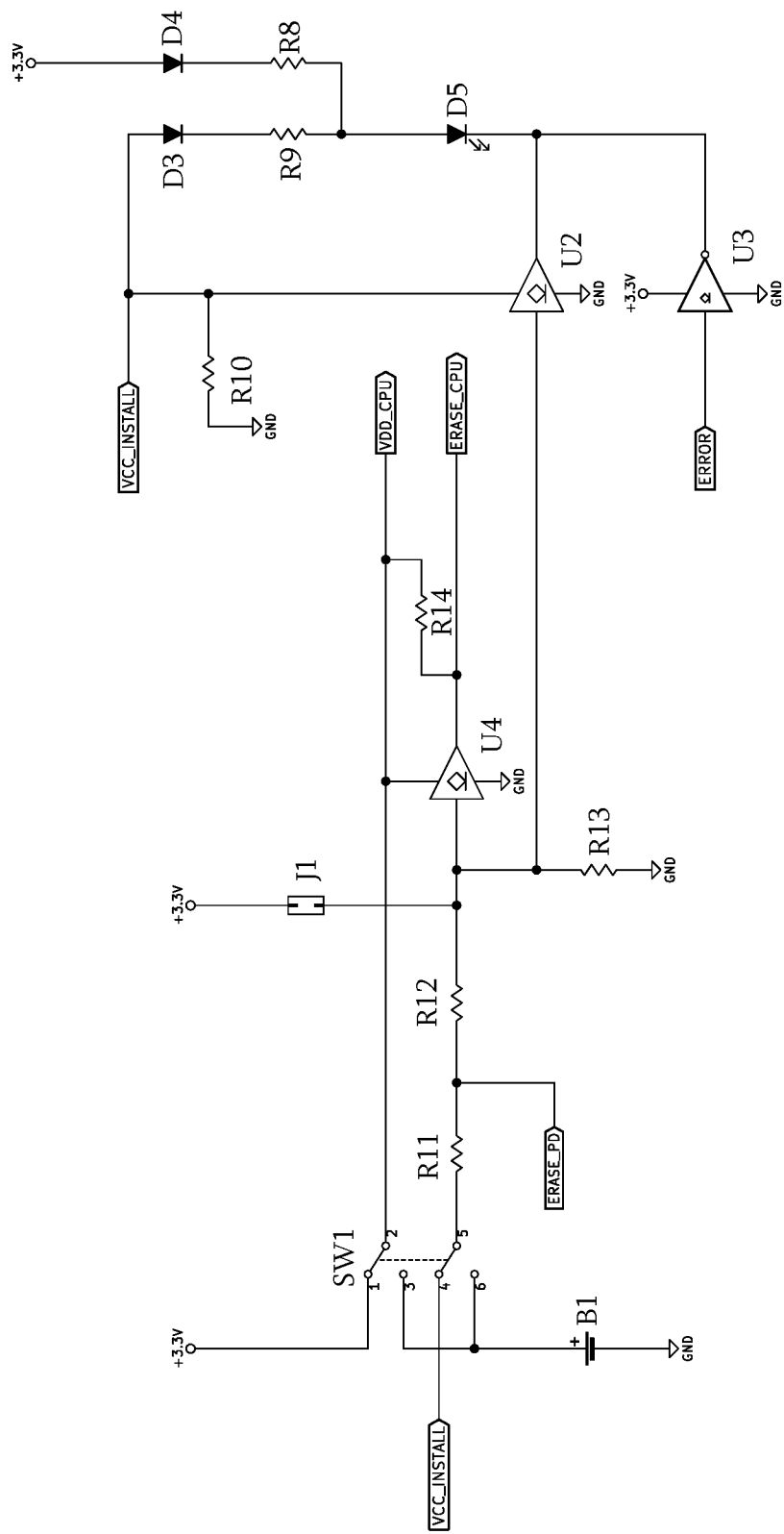

Referring to FIG. 5D, the operation of U2, U3, resistors R8, R9, and R10, diodes D3 and D4, and LED D5 may be similar to that of FIG. 5C. Here diodes D3 and D4 may isolate VCC_INSTALL from 3.3V. The operation of the anti-tamper circuitry 110d may be similar to that of anti-tamper circuitry 110c of FIG. 5C.

Although 3.3V has been used as an example of a power supply voltage, in other embodiments, the power supply voltage may be different.

Figure 6A:
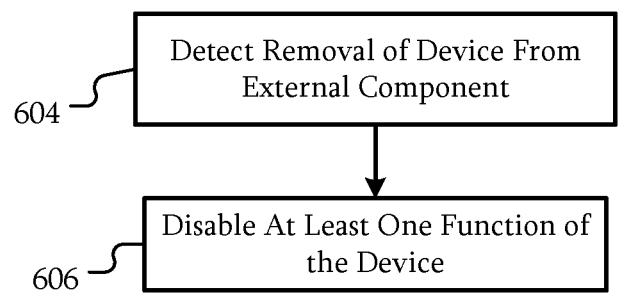
FIGS. 6A and 6B are flowcharts showing techniques of operating a device with anti-tamper circuitry according to some embodiments.
Figure 6B:
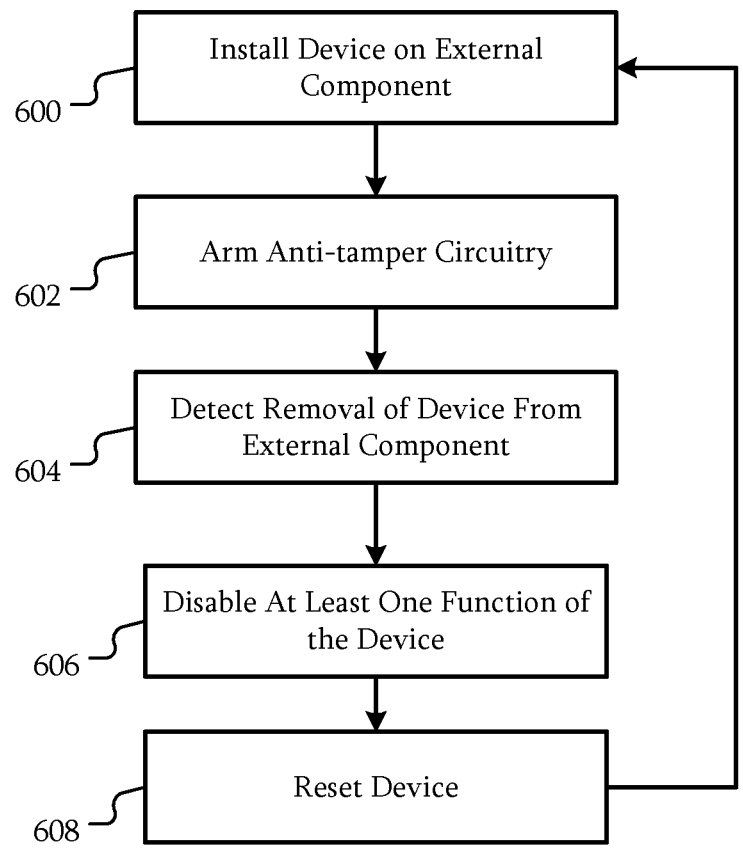

FIGS. 6A and 6B are flowcharts showing techniques of operating a device with anti-tamper circuitry according to some embodiments. Referring to FIG. 6A, in 604 the removal of a device 102 from an external component 104 is detected. As described above, a variety of techniques may be used to detect the removal of the device 102. For example, the change in the state of a switch, the change in a magnetic field, the breaking of a circuit or the like may provide an indication of whether the device 102 is being removed from the external component 104.

In 606, at least one function of the device 102 is disabled. As described above, the at least one function may be disabled by erasing data, disabling components, such as a processor, or the like. Various forms of the anti-tamper circuitry 110 may be used to perform the disabling.

In some embodiments, the detecting of the removal of the device 102 may include detecting the physical separation of structure of the device 102 and a structure of the external component 104. For example, the switch 220 may detect when device 102 is moved relative to the external component 104.

Referring to FIG. 6B, in 600, the device 102 is installed on the external component 104. For example, during authorized installation, replacement of a part, and/or maintenance of a system, a device 102 may be prepared and mounted on the external component 104. During installation, the anti-tamper circuitry 110 may be disarmed. For example, as described above, a removable isolator I such as an insulating tape may be disposed between the power supply 502 contacts and the disable circuit 504.

In 602, the anti-tamper circuitry 110 may be armed. For example, once the device 102 is installed, the insulating tape may be removed, arming the anti-tamper circuitry 110. Before the insulating tape is removed, the device 102 may be mounted and removed repeatedly without engaging the anti-tamper circuitry 110. However, once removed, the anti-tamper circuitry 110 is armed and any attempt to remove the device 102 from the external component 104 may be detected and used to disable at least on function of the circuitry 112 of the device 102 in operations 604 and 606.

Once the anti-tamper circuitry 110 has been triggered and at least one function of the circuitry 112 has been disabled, the device 102 may be reset in 608. Resetting the device 102 includes operations that return the device 102 to a state where it may again be installed or operated in an authorized manner. For example, the device 102 may be returned to an authorized repair facility. The erased data may be restored to the device 102, the disabled components may be reenabled, disabled components may be replaced, the isolator I described above may be reinstalled, or the like such that the device 102 is in a state similar to a device 102 that had not had the at least one function of the circuitry 112 disabled. Although returning the device 102 to an authorized repair facility has been used as an example, the resetting of the device 102 may be performed by an authorized repair technician with the appropriate data and/or components. An unauthorized party may not have the appropriate data and/or components and would not be able to restore the device 102 to an operating condition.

Figure 7:
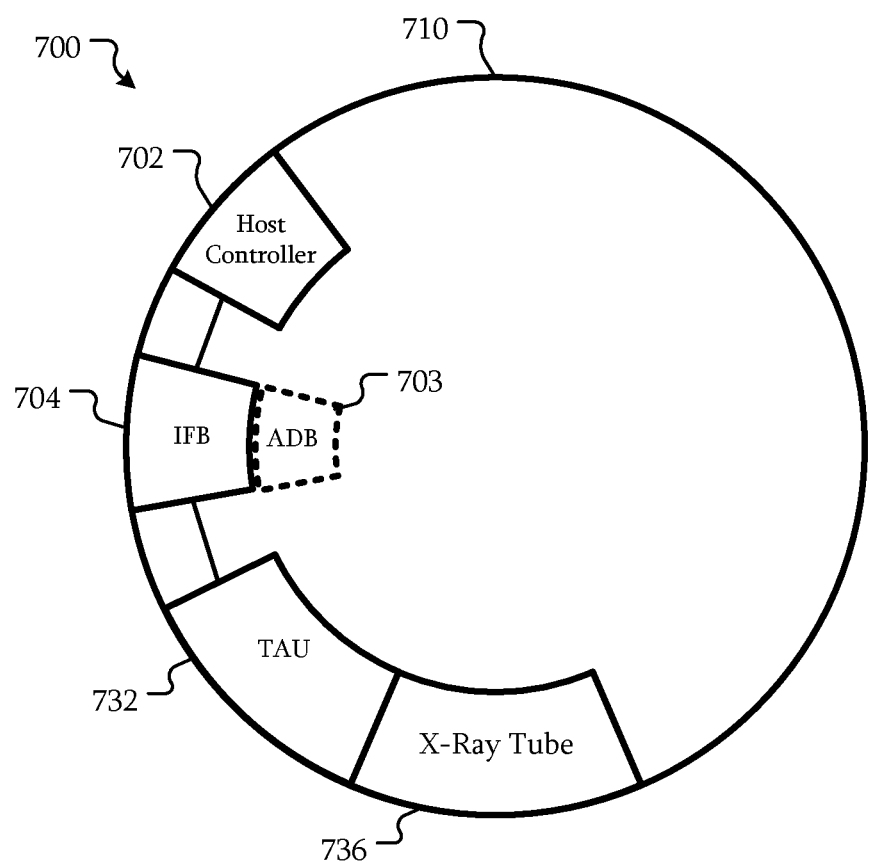
FIG. 7 is a block diagram of an x-ray system according to some embodiments.

FIG. 7 is a block diagram of an x-ray system according to some embodiments. The x-ray system 700 includes a host controller 702, an interface board (IFB) 704, and tube auxiliary unit (TAU) 732, and an x-ray tube 736. These components may be mounted on a rotatable gantry 710.

In some embodiments, a device 102 is the IFB 704 or is part of the IFB 704. The external component 104 may be the gantry 710. Thus, if the IFB 704 is removed from the gantry, at least one function of the IFB 704 may be disabled if the interface board is removed from the gantry 710. The IFB 704 may include firmware, software, calibration data, secret information such as keys, IDs, or other cryptographic information, or the like that may be erased to disable at least one function.

In some embodiments, a device 102 is an authentication daughter board (ADB) 703 that is mounted on the IFB 704. The external component 104 may be the IFB 704. Information such as that described above may be erased if the ADB 703 is removed from the IFB 704.

In some embodiments, a device 102 is the TAU 732. The TAU 732 may be mounted on the x-ray tube 736. The external component 104 may be the x-ray tube 736. Thus, if the TAU 732 is removed from the x-ray tube 736, at least on function of the TAU 732 may be disabled. The TAU 732 may include data or firmware that may be erased similar to the IFB 704 or ADB 703.

In some embodiments, the host controller 702 is configured to control operations of components such as the gantry 710, the IFB 704, the x-ray tube 736 though the TAU 732. While these components are used as examples, other components may be present such as an image detector, a high voltage (HV) generator, a heat exchanger, or the like. The host controller 702 may also be configured to communicate with the IFB 704 and perform various actions such as identification, authentication, or the like in addition to directing control of the system 700.

As described above, in some embodiments the IFB 704 includes the ADB 703. This configuration may allow for easier retrofitting of the ADB 703 to existing CT systems. The IFB 704 has a communication link to the host controller 702 and another communication link to the TAU 732. The ADB 703 contains cryptographic authentication hardware/firmware that allows for encrypted communication with both the host controller 702 and the TAU 732. The IFB 704 is a device that holds the ADB 703 and supplies power to it and translates the communications to the ADB's 703 native communication protocol.

The TAU 732 contains cryptographic authentication hardware/firmware that allows for encrypted communication with the IFB 704/ADB 703 and is attached to the x-ray tube 736. When a hospital installs a new x-ray tube with its attached TAU 732 the IFB 704/ADB 703 may challenge the TAU 732 to see if it is a genuine manufacturer or OEM x-ray tube.

In some embodiments, the authentication unit of the TAU 732 is mounted to the x-ray tube 736, but the authentication unit could also be an integral part of the x-ray tube 736. The anti-tamper circuitry 110 would be part of that authentication unit. Similarly, with other components such as an x-ray detector or imager, accelerator, or other device where it may be beneficial to render the unusable after its removal from its original installation location may include a device 102. Each of those may have associated anti-tamper circuitry 110.

In a particular example, the removal of a used x-ray tube, x-ray detector, or imager from an x-ray or mammography system for the purpose of resale into another system may be prevented. Upon removal of the device 102, a switch in the anti-tamper circuitry 110 would trigger and could disable the authentication function, render the firmware unusable, prevent communication, or any other essential function that would allow further usage of the device 102.

In some embodiments, the anti-tamper circuitry 110 could also be used to reinforce software/firmware (SW/FW) licensing of TAU 732, x-ray tube 736, detector, or other device software that was sold to a specific customer under a license agreement that would only allow the original buyer to utilize the firmware/software (FW/SW) or hardware. In such an embodiment, the respective FW/SW would be automatically erased when the device is removed.

While a CT system with a rotatable gantry 710 has been used as an example of an x-ray system 700, the x-ray system 700 may take other forms.

Some embodiments relate generally to mechanisms, methods, and systems using a system identifier (ID) (or a device ID) in an encrypted form to a component.

In some embodiments, the mechanisms, methods, and systems described herein allows manufacturers or OEMs to detect unauthorized installation of components into their system. Currently, third-party suppliers can swap components on a system against used OEM components or third-party components which can lead to warranty issues, quality issues, and, in the case of an imaging system, image quality issues, diagnostic issues, and misdiagnosis. Embodiments described herein allow for the detection of such unauthorized component changes to ensure the integrity of the system.

Without a system such as those described herein, third parties can buy used components and sell them back to customers and undercut OEM service contracts. In contrast, embodiments described herein allow OEM host systems to determine if their components are being swapped without their permission and/or prevent installation of old, outdated or compromised component into a system that may affect operation, such as replacing a component in an imaging system that will affect the diagnosis of patients. Defective or not optimally functional components can lead to misdiagnosis and in extreme case can cause permanent harm to the patient and even death.

Figure 8B:
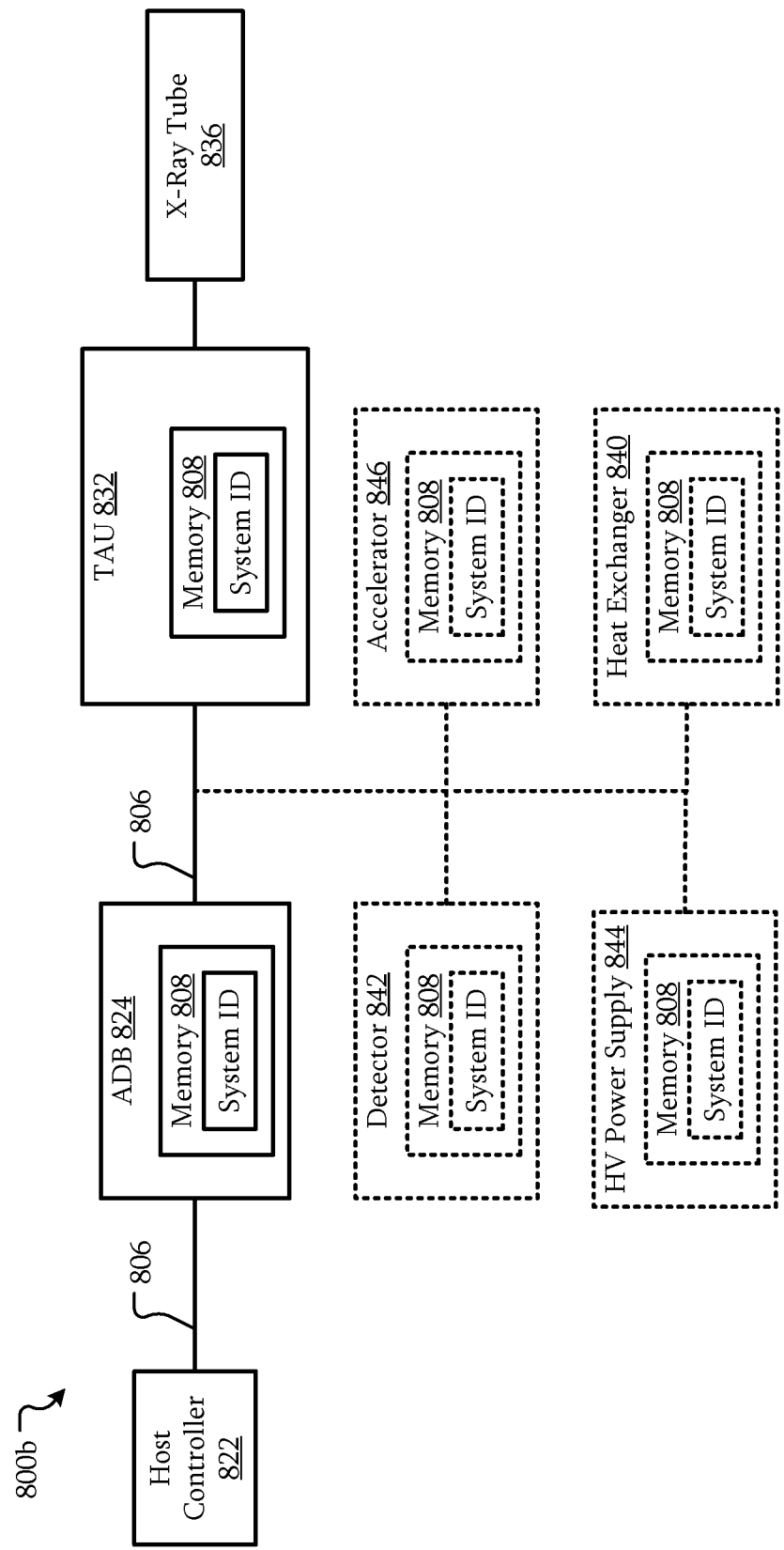

FIG. 8A-8B are block diagrams of systems including an authorization system according to some embodiments. Referring to FIG. 8A, the system 800a includes a first device 802 and a second device 804. The devices 802 and 804 are coupled through a communication link 806. The communication link 806 may be any medium that allows the devices 802 and 804 to communication. For example, the communication link 806 may include a serial link, a parallel link, and automation communication link such as Modbus, CANbus, or the like, a computer bus such as peripheral component interconnect express (PCIe), nonvolatile memory express (NVMe), or the like, and/or a network such as an Ethernet network, a Fibre Channel network, or the like.

The second device 804 includes a non-volatile memory 808. The memory 808 may include any variety of non-volatile memory such as static random access memory (SRAM), flash memory, electrically erasable programmable read only memory (EEPROM), magnetic storage, or the like. In particular, the memory 808 includes at least a portion that is operable in a one-time-write manner. The memory 808 may include other non-volatile memory that is not configured for one-time-writes and/or volatile memory such as a dynamic random access memory (DRAM), a double data rate synchronous dynamic random access memory (DDR SDRAM) according to various standards such as DDR, DDR2, DDR3, DDR4.

Being one-time-write means that the portion of the memory 808 is writable once in a normal write operation. In some embodiments, the one-time write memory 808 may not be erased by other means. As a result, to change a value stored in the memory 808 would require replacing the memory 808. However, in other embodiments, the portion of the memory 808 may be erased by erasing the entire memory 808.

The memory 808 is configured to store a system identifier (ID) in the one-time-write portion. The system ID is an identifier associated with the system 800a. The system ID may be unique to the system 800a such as by being a universally unique ID (UUID) or globally unique ID (GUID). The system ID for all devices 804 and 812 may be the same. However, in other embodiments, the system ID for a particular device 804 or 812 may be unique to both the system 800a and that device 804 or 812. In some embodiments, the system ID may include a portion unique to the system 800a and a portion unique to the particular device 804 or 812, the particular type of device 804 or 812, or the like.

The value of the system ID may take a variety of forms. For example, the system ID may exist in an original form where the stored data is the system ID. However, in other examples, an encrypted form of the system ID, a hash of the system ID, or other representations of the system ID may be stored as the system ID and treated as such with appropriate decoding or other manipulation.

As will be described in further detail below, a system ID can be stored on devices 804 in a system 800a. The first device 802 can verify that the system ID stored on the second device 804 or third device 812 matches the expected system ID such as a system ID associated with the system 800a. A match of the system ID may indicate that the second device 804 or third device 812 is a genuine component intended and originally installed on the system 800a. If the system ID does not match, the device 804 or 812 may have been provided or installed by an unauthorized party. As a result, swapping of devices from other systems of the same manufacturer or from a third party may be detected.

In some embodiments, the first device 802 may be coupled to multiple second devices 804-1 to 804-N. Each second device 804 may be coupled to zero to multiple third devices 812-1 to 812-M.

FIGS. 9A-10C are flowcharts showing examples of techniques of operating an authorization system according to some embodiments. In the following descriptions of techniques of operating the system, operations of a first device 802, a second device 804, and a third device 812 of FIG. 8A will be used as examples.

Referring to FIGS. 8A and 9A, in 902, the first device 802 transmits a request for a system ID stored on the second device 804 to the second device. The second device 804 receives the request in 903. This transmission and other similar operations may occur over the communication link 806.

In 904, the second device 804 determines if the system ID stored on the second device has an empty value. The empty value represents a state where the second device 804 has not stored a system ID in the memory 808. An actual value may not be stored in the memory 808. Instead, a flag, register, state, or the like may indicate that the system ID has not been programmed into the memory 808. Checking such an indicator may be part of determining if the system ID has the empty value. A processor of the second device 804 may be configured to attempt to read the system ID, flag, register, state, or the like to make the determination.

In 906, a response based on the empty value is transmitted to the first device 802. In some embodiments, the response may be a system ID that has a specific meaning. For example, all zeros or all ones may be designated as an empty value for the system ID. In other embodiments, a particular value or values of the system ID may be designated as the empty value. That specific value may be specific to the second device 804 or the type of the second device 804, specific to the system 800a or the type of the system 800a, or the like. Regardless, it is a value that the first device 802 will recognize as indicating that the second device 804 does not store a system ID or that the system ID is the empty value.

In other embodiments, the empty value response may be a different type of message from that used to transmit an actual system ID. For example, the empty value response may be an error message. The error message may have an error number or code that indicates that the system ID is empty.

In 908, the empty value response is received by the first device 802. In response, the first device 802 transmits the system ID to the second device 804 in 910. The second device 804 receives the system ID in 912 and stores it in the one-time write portion of the memory 808. Once the system ID is stored, the memory 808 cannot be reprogrammed with a different system ID without extraordinary steps as described above. As a result, the second device 804 is paired with the system 800a. If the second device 804 is removed from the system 800a and placed in another system, even an identical system, the system ID may not match.

If the system ID is determined to be stored at the second device 804 in 904, a response based on the system ID is returned to the first device 802 in 914. For example, the second device 804 may read the system ID, encrypt it, and transmit the encrypted system ID to the first device 802.

The first device 802 receives the response based on the system ID stored at the second device 804 in 916 and determines if the response indicates that the system ID stored at the second device 804 matches the actual system ID in 918. For example, the first device 802 may extract the system ID by reading it from the response, decoding an encrypted response, or the like and comparing it to the system ID stored on the first device 802. As described above, the system ID may be stored or encoded in a variety of formats. The comparison may be performed in a manner appropriate to the different formats.

If the system ID indicated by the response from the second device 804 is not correct, if the second device 804 does not respond or times out, if the second device 804 returns an improper response, or the like, counter measures may be performed in 920. The counter measures may take a variety of forms. For example, in some embodiments, the system 800a may be shutdown, the devices 802, 804, 816, or the like may be disabled temporarily or permanently, particular functions may be disabled, ranges of operation may be reduced or limited, or the like. In other embodiments, a notification, a warning, or other communication of the mismatched system IDs may be presented to a user of the system 800a, reported over a network, or the like. In other embodiments, information related to the mismatching system IDs may be recorded in memory 808 of the first device 802 and/or the second device 804. The related information may include a timestamp, model numbers and/or serial numbers of the first device 802 and/or the second device 804, number of times the system IDs had not matched, the mismatched system ID, the entire response received in 916, or the like.

In some embodiments, when response based on the system ID is transmitted to the first device 802 from the second device 804 in 914, the communication may be encrypted. For example, a secure communication link may be established between the first and second devices 802 and 804, the response or portions of it may be encrypted, the system ID stored on the second device 804 may be encrypted, or the like. As a result, it may be more difficult for an eavesdropper to obtain the correct system ID response from the second device 804.

The system 800a may be a hierarchical system that includes a third device or devices 812 that are downstream from an associated second device 804. In some embodiments, some or all communication between the first device 802 and the third device 812 may pass through or be manipulated by the associated second device 804. However, in other embodiments, only the communications related to the system ID may pass through or be manipulated by the associated second device 804.

In some embodiments, the interactions between the second device 804 and the third device 812 may be the same or similar to the operations described with respect to the first device 802 and the second device 804. That is, once the second device 804 stores the system ID, the requesting, storing if empty, and verifying of the system ID may be performed between the second and third devices 804 and 812.

Referring to FIGS. 8A, 9A, and 9B, in some embodiments, once the second device 804 has transmitted the system ID response in 914, the second device 804 may begin the operations described above with respect to FIG. 9B. A request for the system ID stored on the third device 812 may be transmitted in 922 from the second device 804 to the third device 812. The third device 812 may receive the request for the system ID stored on the third device 812 in 924. Similar to the operations in 904 and 906 of FIG. 9A, in 926 and 928, the third device 812 may determine if the system ID is the empty value or has not been stored and, if so, return the empty value response. Similar to the operations in 908 and 910 of FIG. 9A, in 930 and 932, the second device 803 receives the response indicating that the system ID stored on the third device 812 has the empty value and transmits the system ID in response. In 934, the third device 812 stores the system ID in the memory 808. Similar to the operations in 914 and 916, in 936 and 938, the third device 812 may transmit a response based on the system ID stored on the third device 812 and that response is received by the second device 804. Although the operations of the second device 804 and the third device 812 have been described as being similar to those of the first device 802 and second device 804, in other embodiments, the operations may be different. For example, different encodings of the system ID, encryption used in transmission, format of responses, particular protocol, or the like may be used.

In 940, the second device 804 may prepare a verification response based on the responses from the third device 812. In some embodiments, the verification response may include the system ID response from the third device 812 itself. In other embodiments, the second device 804 may determine if the system ID stored on the third device 812 matches the system ID stored on the second device 804 similar to the interaction of the first device 802 in 918 of FIG. 9A. The verification response may include an indication of whether the system ID stored on the third device 812 is the correct system ID.

Referring to FIGS. 8A, and 9A-9C, in some embodiments, if the system ID stored on the second device 804 is determined to be the correct system ID in 918, the first device 802 may transmit a verification request to the second device 804 in 941. In 942, the second device 804 receives the verification request. As described above, the second device 804 may prepare a verification response in 940. This verification response may be transmitted by the second device 804 to the first device 802 in 944. In 946, the first device 802 receives the verification response and determines if the verification was successful in 948 based on the response. If the verification was successful, operations continue in 952.

However, if the verification was not successful, counter measures may be performed in 950. The counter measures may be similar to those described with respect to 920. However, as the verification response may be associated with the third device 812, the counter measures may also apply to the third device 812. For example, the third device 812 may be disabled, a notification may be presented identifying the third device 812, or the like.

Referring to FIGS. 8A, 9A, 9B, and 9D, in some embodiments, once the second device 804 has prepared the verification response in 940, the second device 804 may transmit the verification response in 944 to the first device 802 without waiting for the request transmitted in 941. The operations of the first device 802 in 946, 948, 950, and 952 may be similar to those described above.

Although the operations of the first device 802 and second device 804 have been described in the context of communications between the first device 802 and one second device, the same or similar communications may occur between the first device 802 and multiple second devices 804-1 to 804-N. That is, the first device 802 may request the system ID for each of the second devices 804-1 to 804-N and perform operations similar to those described above. The operations for different second devices 804-1 to 804-N may be performed serially or in parallel. Decisions may be based on responses of only one of the second devices 804-1 to 804-N, some of the second devices 804-1 to 804-N, or all of the second devices 804-1 to 804-N. The results of matching or mismatching system IDs may be the same, similar, or different for different second devices 803-1 to 804-N. The operations described between a second device 804 and a third device 812 may similarly be performed with multiple third devices 812. Moreover, although a three-tier hierarchy has been used as an example, and hierarchy of devices may be part of the system 800a where the first device 802 queries other devices for a system ID.

Referring to FIG. 8B, in some embodiments, an x-ray system 800b includes a host controller 822, an ADB 824, a TAU 832, and an x-ray tube 836. The host controller 822 may be a system controller for the x-ray system 800b. The host controller 822 may act as the first device 802 of FIG. 8A and perform the associated operations described in FIGS. 9A-D.

The ADB 824 may be a circuit that manages the system ID and authentication operations of the system 800b. The ADB 824 may include a memory 808. The ADB 824 may act as the second device 804 of FIG. 8A and perform the associated operations described in FIGS. 9A-D.

The TAU 832 is a circuit configured to control the operation of the x-ray tube 836. For example, the TAU 832 may be configured to control cathode voltages/currents, anode voltages/currents, filament voltages/currents, focusing electronics, steering electronics, motors, or the like depending on the particular x-ray tube 836. The TAU 832 includes a memory 808 and may act as the third device 812 of FIG. 8A and perform the associated operations described in FIGS. 9A-D.

While the TAU 832 has been used as an example of a device in an x-ray system 800b that may operate using a system ID as described herein, other devices in an x-ray system 800b may operate similarly. For example, a heat exchanger 840, detector 842, high voltage (HV) power supply, 844, accelerator 846, or the like may operate using a system ID as described herein.

In some embodiments, at initialization or installation, a system ID may be transmitted from the host controller 822 to the ADB 824 and stored in memory 808. The ADB 824 may similarly propagate the system ID to the other devices 832, 840, 842, 844, 846, 848, or the like for storage in corresponding memory 808 of those devices. Thus, the devices of the system 800b may be paired with that system 800b. In normal operation, the devices will report the correct system ID and the system 800b may continue operation. However, if a part is replaced in an unauthorized manner with a different, existing system ID, the counter measures described above may be performed.

In some embodiments, the host controller uses the ADB 824 to communicate with the rest of the manufacturer or OEM's components in the system 800b. In some embodiments the only components that are paired with the system 800b are the ADB 824 and the TAU 832.

The use of the system ID as described herein in an x-ray system 800b may improve safety and/or longevity of the system 800b. In particular, the components of the system 800b may be aligned, calibrated, or otherwise configured for that specific x-ray system 800b. When the system 800b is initially installed, the empty system IDs in the various devices of the x-ray system 800b may be initialized to a system ID unique to that particular x-ray system 800b. If a device in the x-ray system 800b is replaced by a device from another system with a different system ID, the operation of the x-ray system 800b may not be the same and, with devices such as the x-ray tube 836, may become dangerous. As described above, the x-ray system 800b may take counter measures when such a situation is detected, notifying a user, shutting down the x-ray system 800b or a component, or the like. As a result, a chance that the x-ray system 800b will be operated in a manner that may lead to erroneous results and/or dangerous operating conditions may be reduced or eliminated.

In some embodiments, the storage and verification of the system ID as described herein may limit a manufacturer or vendor's customers ability to swap components themselves or through a third party. The verification process checks to see if the ADB 824, TAU 832, or the like is a genuine manufacturer or OEM product and that it hasn't been swapped to/from other x-ray systems. It prevents third party service organizations buying used x-ray tubes on the open market, refurbishing them and then selling them back to customers such as hospitals. A manufacturer, vendor, system integrator, or the like may reduce a chance that their system is modified with devices from other systems, which may lead to undesirable or dangerous results.

In some embodiments, use of the system ID as described herein may reduce a chance that a reworked device is installed in a system for which it was not intended. For example, a device that has been paired with a system and has a system ID may returned for repair, updates, or the like. The device may be programmed with the original system ID or the system ID may be left intact. As a result, when that device is supplied to a customer or installer, the system ID will match the system ID of the original system. If the device is installed in a different system, even if a similar system or the same type of system, the system ID will not match and the counter measures described above may be performed. In some embodiments, the system ID may be left unprogrammed if a known customer or installer will reinstall the device in the same system.

Referring to FIGS. 8A and 9A-10C, in some embodiments, authentication operations may be performed after successful verification in 948 described above. For example, in 1002, the first device 802 transmits an authentication request to the second device 804. In 1004, the authentication request is received by the second device 804. The second device 804 transmits an authentication request to the third device 812 in 1006.

The third device 812 receives the authentication request in 1008. In 1010, the third device generates an authentication response and transmits that authentication response to the second device 804 in 1012.

The second device 804 receives the authentication response from the third device 812 in 1014. The second device 804 analyzes the authentication response 1016, logs failures in 1018, and generates its own authentication response in 1020. The authentication response generated in 1020 may aggregate the authentication response or responses received from one or more third devices 812 and the second device's 804 own authentication response.

In 1022, the first device 802 may transmit a request for the authentication status that is received by the second device in 1024 as illustrated in FIG. 10B. In response, the second device 804 transmits the authentication response to the first device 802 in 1026. Alternatively, the second device 804 may transmit the authentication response to the first device 802 in 1026 after generating it in 1020 as illustrated in FIGS. 10A and 10C.

Once the authentication response is received in 1028, the response may be analyzed to determine if the authentication is successful in 1030. If so, the operations may continue in 1034. If not, counter measures make be performed in 1032 similar to the counter measures described above.

A variety of different techniques may be used to authenticate the devices 804 and 812. In some embodiments, the authentication may be performed using a challenge using hidden numbers. An encryption algorithm may use an initialization vector (IV) and an encryption key (key). The first device 802 and/or the second device 804 may create a challenge (math problem) using its IV and key and sends it the downstream second device 804 or third device 812. If that device has the same key and IV then it may do the same math problem and get the same result. The second device 804 or third device 812 that was "challenged" may then send back the "answer" to that math problem in an encrypted form and the original component can make sure that it answered the challenge correctly. If it responded with the correct answer then the first device 802 and/or the second device 804 may treat the corresponding second device 804 or third device 812 as a genuine part.

In some embodiments, the IV and the key are maintained in restricted memory of a cryptographic authentication integrated circuit. For example, an ATSHA integrated circuit may include such restricted memory and may be capable of performing calculations related to encrypted communications. The authentication operations may be more secure if the IV and key are stored in such restricted memory.

In some embodiments, the authentication process may be used to ensure that all required components are in the system, are designed for the particular customer, and/or are genuine manufacturer or OEM components. Different customers may have customer specific encryption keys so that a third party cannot take a component designed for one customer and sell it to another. Any missing components will fail the authentication process as they will not authenticate if they are not present. The authentication process may prevent a third party from supplying part of the system. If the full computed tomography (CT) system is designed to have 5 manufacturer or OEM components but only 4 of them are genuine and the fifth was sourced from a third party, the authentication process would identify that fifth component as not genuine.

As described above, more than one second device 804 and more than one third device 812 may be present in the system 800a. The authentication with each of these as described with respect to the single second device 804 and single third device 812.

While the system 800a of FIG. 8A was used as an example, the authentication operation operations described above with respect to FIGS. 10A-C may be implemented by other systems, such as the x-ray system 800b of FIG. 8B.

Some embodiments include a device 102, comprising: a mounting structure configured to mount the device 102 to an external component 104; first circuitry 112; and anti-tamper circuitry electrically connected to the first circuitry 112 and configured to disable at least one function of the first circuitry 112 when the device 102 is removed from the external component 104. In some embodiments, the external component 104 may include a wall, housing, or other structure that is not controlled by the first circuitry 112.

In some embodiments, the first circuitry 112 is configured to control the external component 104. In some embodiments, the at least one function of the first circuitry 112 include functions that are not related to the control of the external component 104.

In some embodiments, the at least one function of the first circuitry 112 comprises functions of the first circuitry 112 that control the external component 104.

In some embodiments, the device 102 further comprises: a housing 116 coupled to the mounting structure wherein the housing 116 is configured to restrict access to disarm the anti-tamper circuitry when the device 102 is mounted to the external component 104.

In some embodiments, the anti-tamper circuitry 110 comprises: a switch 220 or SW1 coupled to the mounting structure 116 and configured to switch when the device 102 is removed from the external component 104.

In some embodiments, the switch 220 or SW1 is configured to switch by a structure of the external component 104 when mounted on the external component 104.

In some embodiments, the anti-tamper circuitry 110 comprises: a power supply 502 disposed within the device 102 and configured to supply power after detecting removal of the device 102 from the external component 104; and a disable circuit 504 configured to disable the at least one function of the first circuitry 112; wherein the switch 220 or SW1 is configured to electrically connect the power supply 502 to the disable circuit 504 when the device 102 is removed from the external component 104.

In some embodiments, the first circuitry 112 includes a processor 113; and the anti-tamper circuitry 110 is configured to erase at least a portion of memory 118 or 808 used by the processor 113 when the device 102 is removed from the external component 104.

In some embodiments, the at least a portion of memory 118 or 808 used by the processor 113 comprises memory 118 or 808 integrated with the processor 113.

In some embodiments, the at least a portion of memory 118 or 808 used by the processor 113 stores cryptographic information.

In some embodiments, the device 102 is part of electronics associated with an x-ray system; and the external component 104 is an x-ray tube 736 or 836 of the x-ray system 700 or 800b.

In some embodiments, the device 102 is part of a component authentication system associated with an x-ray system 700 or 800b.

Some embodiments include a method, comprising: detecting, by a device 102, removal of the device 102 from a component 104 external to the device 102; and disabling at least one function of circuitry 112 of the device 102 in response to detecting the removal of the device 102 from the component 104.

In some embodiments, the detecting, by the device 102, removal of the device 102 from the component 104 comprises detecting physical separation of a structure of the device 102 and a structure of the component 104 external to the device 102.

In some embodiments, the disabling of at least one function of the circuitry 112 of the device 102 comprises: powering a disable circuit 504 from an internal power supply 502; and disabling the at least one function of the circuitry of the device 102 using the disable circuit 504.

In some embodiments, the detecting, by the device 102, removal of the device 102 from the component 104 comprises detecting physical separation of a structure of the device 102 and a structure of the component 104 external to the device 102.

In some embodiments, the method further comprises: installing the device 102 on the component 104; and arming anti-tamper circuitry 110 configured to disable to at least one function of the circuitry of the device 102.

In some embodiments, the method further comprises: resetting anti-tamper circuitry 110 configured to disable to at least one function of the circuitry 112 of the device 102.

Some embodiments include a device, comprising: means for detecting, by a device, removal of the device from a component external to the device; and means for disabling at least one function of circuitry of the device in response to the means for detecting the removal of the device from the component. Examples of the means for detecting include the anti-tamper circuitry 110, switch 220 or SW1, or the like. Examples of the means for disabling at least one function of circuitry of the device include the anti-tamper circuitry 110, the processor 113, the memory 118 or 808, or the like.

In some embodiments, the device further comprises: means for detecting physical separation of the device from the component; and means for erasing at least part of memory of the circuitry in response to the means for detecting physical separation of the device 102 from the component. Examples of the means for detecting physical separation of the device from the component include the anti-tamper circuitry 110, switch 220 or SW1, or the like. Examples of the means for erasing at least part of memory of the circuitry comprise the anti-tamper circuitry 110, the processor 113, the memory 118 or 808, or the like.

Some embodiments include a method, comprising: receiving from a first device 802 at a second device 804, a request for a system identifier (ID) stored on the second device 804; determining, by the second device 804, if the system ID stored on the second device 804 has an empty value; and when the system ID stored on the second device 804 does not have the empty value, transmitting, by the second device 804 to the first device 802, a response based on the system ID stored on the second device 804.

In some embodiments, the method further comprises: when the system ID stored on the second device 804 has the empty value, communicating, by the second device 804 to the first device 802, that the system ID stored on the second device 804 has the empty value.

In some embodiments, the method further comprises: receiving, from the first device 802 by the second device 804, the system ID; and storing, by the second device 804, the system ID received from the first device 802 as the system ID stored on the second device 804.

In some embodiments, storing, by the second device 804, the system ID received from the first device 802 as the system ID stored on the second device 804 comprises storing, by the second device 804, the system ID received from the first device 802 in one-time-write memory 808.

In some embodiments, transmitting, by the second device 804 to the first device 802, the response based on the system ID stored on the second device 804 comprises encrypting the system ID stored on the second device 804 and transmitting, by the second device 804 to the first device 802, the encrypted system ID.

In some embodiments, the method further comprises: transmitting, by the second device 804 to a third device 812, a request for a system ID stored on the third device 812; and receiving, by the second device 804 from the third device 812, a response to the request for the system ID stored on the third device 812.

In some embodiments, the method further comprises: transmitting, by the second device 804 to the first device 802, a response based on the response to the request for the system ID stored on the third device 812.

In some embodiments, the method further comprises: determining, by the third device 812, if the system ID stored on the third device 812 has the empty value; and when the system ID stored on the third device 812 has the empty value, communicating, by the third device 812 to the second device 804, that the system ID stored on the third device 812 has the empty value.

In some embodiments, the method further comprises: storing, by the third device 812, the system ID received from the second device 804 as the system ID stored on the third device 812.

In some embodiments, the second device 804 is an authentication device for an x-ray system 800*b*; and the third device 812 is a control device for an x-ray tube 836 of the x-ray system 800*b*.

Some embodiments include a method, comprising: transmitting, from a first device 802 to a second device 804, a request for a system identifier (ID) stored on the second device 804; receiving, from the second device 804 by the first device 802, a response to the request for the system ID stored on the second device 804; determining, by the first device 802, if the system ID stored on the second device 804 is a correct system ID for a system including the second device 804; and operating the system including the second device 804, by the first device 802, based on whether the system ID stored on the second device 804 is the correct system ID for the system including the second device 804.

In some embodiments, operating the system including the second device 804 comprises enabling counter measures when the system ID stored on the second device 804 is not the correct system ID for the system including the second device 804.

In some embodiments, the counter measures comprise at least one of disabling the second device 804, disabling the system including the second device 804, presenting a warning that the system ID stored on the second device 804 and the correct system ID for the system including the second device 804 do not match to a user.

In some embodiments, operating the system including the second device 804 comprises, when the system ID stored on the second device 804 matches the correct system ID for the system including the second device 804, transmitting, by the first device 802 to the second device 804, a request for verification of devices subordinate to the second device 804.

In some embodiments, the method further comprises: receiving, by the first device 802 from the second device 804, a response to the request for verification of devices subordinate to the second device 804; wherein operating the system including the second device 804 comprises operating the system based on the response to the request for verification of at least one device subordinate to the second device 804.

In some embodiments, the second device 804 is an authentication device for an x-ray system 800*b*; and the at least one device subordinate to the second device 804 is a control device for an x-ray tube 836 of the x-ray system 800*b*.

In some embodiments, the method further comprises: transmitting, from the first device 802 to the second device

804, a request for authentication of the second device 804; and receiving, by the first device 802 from the second device 804, a response to the request for authentication of the second device 804; wherein operating the system including the second device 804 comprises operating the system including the second device 804 based on the response to the request for authentication of the second device 804.

Some embodiments include a device, comprising: means for receiving, from a first external device, a request for a system identifier (ID) stored on the device; means for determining if the system ID stored on the device has an empty value; and means for transmitting, to the first device, a response based on the system ID stored on the device when the system ID stored on the device does not have the empty value. Examples of the means for receiving, from a first external device, a request for a system identifier and the means for transmitting, to the first device, a response based on the system ID include the second device 804, the third device 812 or the like.

In some embodiments, the device further comprises: means for transmitting, to a second external device, a request for a system ID stored on the second external device; and means for receiving, from the third device, a response to the request for the system ID stored on the second external device. Examples of the means for transmitting, to a second external device, a request for a system ID and the means for receiving, from the third device, a response to the request for the system ID include the second device 804, the third device 812 or the like.

Some embodiments include at least one non-transitory machine-readable storage medium comprising a plurality of instructions adapted to be executed to implement the method described above.

The summary provided above is illustrative and is not intended to be in any way limiting. In addition to the examples described above, further aspects, features, and advantages of the invention will be made apparent by reference to the drawings, the following detailed description, and the appended claims.

Circuitry can include hardware, firmware, program code, executable code, computer instructions, and/or software. A non-transitory computer readable storage medium can be a computer readable storage medium that does not include a signal.

The operations described above may be implemented in various circuitry. For example, the operations may be implemented as a hardware circuit comprising custom very-large-scale integration (VLSI) circuits or gate arrays, including but not limited to logic chips, transistors, or other components. The operations may also be implemented in programmable hardware devices, including but not limited to field programmable gate arrays (FPGA), programmable array logic, programmable logic devices or similar devices.

Reference throughout this specification to an "example" or an "embodiment" means that a particular feature, structure, or characteristic described in connection with the example is included in at least one embodiment of the invention. Thus, appearances of the words an "example" or an "embodiment" in various places throughout this specification are not necessarily all referring to the same embodiment.

Furthermore, the described features, structures, or characteristics may be combined in a suitable manner in one or more embodiments. In the following description, numerous specific details are provided (e.g., examples of layouts and designs) to provide a thorough understanding of embodiments of the invention. One skilled in the relevant art will recognize, however, that the invention can be practiced without one or more of the specific details, or with other methods, components, layouts, etc. In other instances, well-known structures, components, or operations are not shown or described in detail to avoid obscuring aspects of the invention.

Elements specifically recited in means-plus-function format, if any, are intended to be construed to cover the corresponding structure, material, or acts described herein and equivalents thereof in accordance with 35 U.S.C. § 112 ¶6.

While the forgoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited. Various features and advantages of the invention are set forth in the following claims.

What is claimed is:

1. A method, comprising:
    receiving from a first device at a second device, a request for a system identifier (ID) stored on the second device;
    determining, by the second device, if the system ID stored on the second device has an empty value, wherein the empty value represents a state where a value has not been stored on the second device as the system ID; and
    when the system ID stored on the second device does not have the empty value, transmitting, by the second device to the first device, a response based on the system ID stored on the second device.

2. The method of claim 1, further comprising:
    when the system ID stored on the second device has the empty value, communicating, by the second device to the first device, that the system ID stored on the second device has the empty value.

3. The method of claim 2, further comprising:
    receiving, from the first device by the second device, the system ID in response to the communication that the system ID stored on the second device has the empty value; and
    storing, by the second device, the system ID received from the first device as the system ID stored on the second device.

4. The method of claim 3, wherein:
    storing, by the second device, the system ID received from the first device as the system ID stored on the second device comprises storing, by the second device, the system ID received from the first device in one-time-write memory.

5. The method of claim 1, wherein:
    transmitting, by the second device to the first device, the response based on the system ID stored on the second device comprises encrypting the system ID stored on the second device and transmitting, by the second device to the first device, the encrypted system ID.

6. The method of claim 1, further comprising:
    transmitting, by the second device to a third device, a request for a system ID stored on the third device; and
    receiving, by the second device from the third device, a response to the request for the system ID stored on the third device.

7. The method of claim 6, further comprising:
    transmitting, by the second device to the first device, a response based on the response to the request for the system ID stored on the third device.

8. The method of claim 6, further comprising:
determining, by the third device, if the system ID stored on the third device has the empty value; and
when the system ID stored on the third device has the empty value, communicating, by the third device to the second device, that the system ID stored on the third device has the empty value.

9. The method of claim 8, further comprising:
storing, by the third device, the system ID received from the second device as the system ID stored on the third device.

10. The method of claim 6, wherein:
the second device is an authentication device for an x-ray system; and
the third device is a control device for an x-ray tube of the x-ray system.

11. At least one non-transitory machine-readable storage medium comprising a plurality of instructions adapted to be executed to implement the method of claim 1.

12. The method of claim 1, wherein:
determining, by the second device, if the system ID stored on the second device has the empty value comprises determining, by the second device, if the system ID stored on the second device has the empty value without comparing the system ID stored on the second device to a valid system ID.

13. A device, comprising:
means for receiving, from a first external device, a request for a system identifier (ID) stored on the device;
means for determining if the system ID stored on the device has an empty value, wherein the empty value represents a state where a value has not been stored on the device as the system ID; and
means for transmitting, to the first external device, a response based on the system ID stored on the device when the system ID stored on the device does not have the empty value.

14. The device of claim 13, further comprising:
means for transmitting, to a second external device, a request for a system ID stored on the second external device; and
means for receiving, from the second external device, a response to the request for the system ID stored on the second external device.

* * * * *